(12) United States Patent
Aikawa et al.

(10) Patent No.: US 7,223,191 B2
(45) Date of Patent: May 29, 2007

(54) POWER TRANSMISSION SYSTEM AND OPERATION METHOD THEREOF

(75) Inventors: Masashi Aikawa, Tochigi-Ken (JP); Nobushi Yamazaki, Tochigi-Ken (JP)

(73) Assignee: Tochigi Fuji Sangyo Kabushiki Kaisha, Tochigi-Shi (JP)

( * ) Notice: Subject to any disclaimer, the term of this patent is extended or adjusted under 35 U.S.C. 154(b) by 0 days.

(21) Appl. No.: 11/386,274

(22) Filed: Mar. 21, 2006

(65) Prior Publication Data

US 2006/0166777 A1    Jul. 27, 2006

Related U.S. Application Data

(60) Continuation of application No. 10/772,097, filed on Feb. 3, 2004, now Pat. No. 7,086,978, which is a division of application No. 09/829,335, filed on Apr. 9, 2001, now Pat. No. 6,770,005.

(30) Foreign Application Priority Data

Apr. 7, 2000    (JP)    ............ P2000-107026

(51) Int. Cl.
 F16H 37/08    (2006.01)
 F16H 3/72    (2006.01)
 B60K 1/02    (2006.01)
(52) U.S. Cl. ............... 475/200; 475/5; 475/8; 477/3
(58) Field of Classification Search ............ 475/5, 475/8, 200, 201, 206; 180/245, 248; 477/3
 See application file for complete search history.

(56) References Cited

U.S. PATENT DOCUMENTS

| 4,249,429 A | 2/1981 | Denning |
| 4,366,724 A | 1/1983 | Yamamori et al. |
| 4,417,642 A | 11/1983 | Suzuki |
| 4,418,777 A | 12/1983 | Stockton |
| 4,420,059 A | 12/1983 | Suzuki |
| 4,754,847 A | 7/1988 | Glaze et al. |
| 4,805,486 A | 2/1989 | Hagiwara et al. |
| 5,046,998 A | 9/1991 | Frost |
| 5,385,513 A * | 1/1995 | Ishii et al. ............ 475/203 |
| 5,503,603 A | 4/1996 | Adam et al. |
| 5,558,588 A | 9/1996 | Schmidt |
| 5,603,671 A | 2/1997 | Schmidt |
| 5,609,540 A | 3/1997 | Brissenden et al. |
| 5,620,287 A | 4/1997 | Pratt |
| 5,620,387 A | 4/1997 | Janiszewski |
| 5,715,901 A | 2/1998 | Tokushima |
| 5,807,205 A | 9/1998 | Odaka et al. |
| 5,821,653 A | 10/1998 | Kinto et al. |
| 5,839,533 A | 11/1998 | Mikami et al. |

(Continued)

FOREIGN PATENT DOCUMENTS

EP    0879728    4/1998

(Continued)

Primary Examiner—Roger Pang
(74) Attorney, Agent, or Firm—Morrison & Foerster LLP

(57) ABSTRACT

Between a speed reducing mechanism (15, 17, 19) for speed-reducing drive power of an electric motor and a differential apparatus (7) for distributing speed-reduced drive power to axle ends is disposed a clutch (5) configured for interruptive transmission of drive power.

4 Claims, 21 Drawing Sheets

U.S. PATENT DOCUMENTS 6,008,606 A  12/1999  Arai et al.
6,027,422 A  2/2000  Yamazaki
6,074,321 A  6/2000  Maeda et al.
6,302,227 B1  10/2001  Takemura et al.
6,334,498 B1  1/2002  Morisawa et al.
RE37,743 E  6/2002  Yang
6,435,296 B1  8/2002  Arai 2002/0007974 A1  1/2002  Nagano et al.

FOREIGN PATENT DOCUMENTS

EP  0800949  11/1998
EP  0876933  11/1998
FR  002693527 A1  1/1994
JP  09-226394  9/1997

* cited by examiner

β > γ

POWER TRANSMISSION SYSTEM AND OPERATION METHOD THEREOF

CROSS-REFERENCE TO RELATED APPLICATION

This application is a continuation of U.S. patent application Ser. No. 10/772,097 filed Feb. 3, 2004, now U.S. Pat. No. 7,086,978 which in turn is a division of U.S. application Ser. No. 09/829,335 filed Apr. 9, 2001 (now U.S. Pat. No. 6,770,005), which are specifically incorporated herein, in their entirety, by reference.

BACKGROUND OF THE INVENTION

1. Field of the Invention

The present invention relates to a power transmission system, such as for an electric automobile using an electric motor as a drive power source or an electric automobile using a fuel engine (an ordinary engine making use of an explosion of fuel) and an electric motor both as a drive power source, and to an operation method for the same.

2. Description of the Related Art

There is disclosed in Japanese Patent Application Laid-Open Publication No. 9-226394 a drive system 2001 for electric automobiles shown in FIG. 22.

The drive system 2001 for electric automobiles includes an electric motor 2003, a reduction gear set 2005, and a differential apparatus 2007.

The electric motor 2003 is driven by a vehicle-mounted battery to produce drive power, which is decreased in speed by the reduction gear set 2005 within a range of the number of revolutions of a traveling wheel and increased in torque, and resultant drive power is distributed via the differential apparatus 2007 to wheels.

In the drive system 2001, as shown in FIG. 22, the electric motor 2003 and the reduction gear set 2005 as well as this reduction gear set 2005 and the differential apparatus 2007 are connected directly with no clutch disposed on the way.

On the other hand, FIG. 23 shows an example of a power transmission system for a four-wheel driven vehicle having an ordinary engine as a drive power source.

This power transmission system includes a transversely arranged engine 2101, a transmission 2103, a belt-driving transfer 2105, a front differential 2107 (as a differential apparatus for distributing drive power from the engine 2101 to left and right front wheels), front axles 2109 and 2111, left and right front wheels 2113 and 2115, a rear-wheel end propeller shaft 2117, a coupling 2118, a rear differential 2119, rear axles 2121 and 2123, left and right rear wheels 2125 and 2127.

The drive power from the engine 2101 is transmitted from an output gear 2129 of the transmission 2103 via a ring gear 2131 to a differential case 2133, to be distributed from the front differential 2107 via the front axles 2109 and 2111 to the left and right front wheels 2113 and 2115, or to be transmitted via the differential case 2133, the transfer 2105, and the propeller shaft 2117 to the rear wheel end.

In this arrangement, the coupling 2118 disposed in a power transmission subsystem at the rear wheel end is employed for control of torque transmission to the rear wheels 2125 and 2127.

For example, when the coupling 2118 is connected, drive power from the engine 2101 is distributed from the rear differential 2119 via the rear axles 2121 and 2123 to the left and right rear wheels 2125 and 2127, rendering the vehicle four-wheel driven.

When the coupling 2118 is disconnected, the rear differential 2119 and subsequent elements of the rear wheel end subsystem are cut off, rendering the vehicle two-wheel driven.

In the conventional electric automobiles, an electric motor is connected directly to wheels, and even in a case of interruption of power supply to the electric motor, such as when travelling by inertia, the electric motor is forced to rotate together with wheel rotation, with burdens on the electric motor.

For example, if the electric motor is a brush type like a DC motor, brushes receive a great influence on the durability, resulting in increased maintenance costs, such as by increase in number of services for brush replacement.

Further, when caused to rotate by wheels, the electric motor serves as a generator, producing electromotive forces (emf). As the rotation is increased in speed by the reduction gear set, there is produced a greater emf, resulting in burdens, such as on a battery or alternator (not shown) or on circuit elements such as a regulator constituted as an integrated circuit, causing a reduced durability.

SUMMARY OF THE INVENTION

The present invention is made with such points in view. It therefore is an object of the present invention to provide a power transmission system with a compact size, light weight, and well adaptation for vehicle-mounting, preventing an electric motor from being caused to rotate by rotation of wheels, and an operation method for the same.

To achieve the object, according to a $1^{st}$ aspect of the invention, there is provided a power transmission system comprising a speed reducing mechanism for speed-reducing drive power of an electric motor, a differential apparatus for distributing speed-reduced drive power to axle ends, and a clutch configured for interruptive transmission of drive power between the speed-reducing mechanism and the differential apparatus.

Accordingly, in case power supply to the electric motor is interrupted, such as when travelling by inertia, connection of the clutch is canceled, thereby disconnecting the electric motor from wheels.

Thus, the electric motor is set free from being rotated by rotation of the wheels, and kept from generating emf that otherwise might have imposed loads on a battery, alternator, or controller's circuit elements, allowing these to have maintained performances, with a greatly improved durability.

Because mechanical rotation is prevented, burdens on and temperature rise of magnetic field or rotor side windings of the electric motor are reduced, as well as burdens on bearings, with a greatly improved durability.

In case of a brush type electric motor, such as a DC motor, the brushes have greatly improved durability, with a commensurate reduction in frequency of their replacement, with reduction of maintenance cost.

According to a $2^{nd}$ aspect second aspect of the invention, a power transmission system according to the $1^{st}$ aspect further comprises a main drive power source, and the electric motor used as an auxiliary drive power source relative to the main drive power source.

Accordingly, in a four-wheel driven vehicle using both a main drive power source (engine) and an electric motor, when the electric motor is rotated with the clutch in connection, the vehicle enters a four-wheel driven state with improvements such as in abilities of start, acceleration, and riding performances such as on differences in level or cavities in road.

In a two-wheel driven travel at the engine side, or upon occurrence of a rollback by front wheels idling such as on an inclined road low of surface frictional resistance in a four-wheel driven travel, the clutch is disconnected to interrupt connection between the electric motor and wheels, whereby the electric motor is kept from being rotated by rotation of wheels, allowing for like effects to the $1^{st}$ aspect to be achieved.

According to a $3^{rd}$ aspect of the invention, in a power transmission system according to the $1^{st}$ or $2^{nd}$ aspect, the speed-reducing mechanism comprises a plurality of reduction gear sets including a first reduction gear set for inputting thereto drive power from the electric motor, the first reduction gear set comprising a planetary gear, whereby like effects to the $1^{st}$ or $2^{nd}$ aspect are achieved.

In addition, by use of the planetary gear in the first reduction gear set, the speed-reducing mechanism which is constituted with a plurality of stages can be made small in size.

In particular, in the case the electric motor is used as an auxiliary drive power source relative to the main drive power source, the input from the electric motor to the speed-reducing mechanism is has a smaller value than a case the electric motor is used as a main drive power source, and the arrangement in which the first reduction gear set is constituted with the planetary gear allows an efficient reduction in size of the speed-reducing mechanism.

According to a $4^{th}$ aspect of the invention, in a power transmission system according to the $3^{rd}$ aspect, the speed-reducing mechanism is provided with an oil pump for supplying lubricant to the planetary gear, whereby like effects to the $3^{rd}$ aspect can be achieved, in addition to effective lubrication of the planetary gear, possible reduction of meshing resistance of the planetary gear, and preventive gnaw of gears.

According to a $5^{th}$ aspect of the invention, in a power transmission system according to the $4^{th}$ aspect, the oil pump is provided on a lid side of a case, whereby like effects to the $4^{th}$ aspect can be achieved.

In addition, oil pump can be machined and mounted with ease, and a lid part of the case can be used as part of the oil pump to constitute an tight-closed part, with a simplified structure.

According to a $6^{th}$ aspect of the invention, in a power transmission system according to any of the $1^{st}$ to $5^{th}$ aspects, the speed-reducing mechanism comprises a plurality of reduction gear sets, and the clutch is disposed in a power transmission path of the speed-reducing mechanism, whereby like effects to the $1^{st}$ to $5^{th}$ aspects can be achieved.

In addition, this arrangement in which the clutch is disposed in a power transmission path of the speed-reducing mechanism allows, for example, a selected clutch to be disposed in a place optimal of speed reduction ratio in accordance with the type and capacity, or an optimal clutch to be selected in accordance with sliding speed or transmitting torque of reduction gears, and the like.

Like this, flexibility of design can be increased with respect to the place for disposition of the clutch, as well as to the clutch selection.

According to a $7^{th}$ aspect of the invention, in a power transmission system according to the $6^{th}$ aspect, the speed-reducing mechanism and the differential apparatus are neighbored to each other, and the clutch is coaxially provided to one of the plurality of reduction gear sets of the speed-reducing mechanism that is nearest to the differential apparatus, whereby like effects to the $6^{th}$ aspect can be achieved.

In addition, because the clutch is coaxial to one of reduction gear sets of the speed-reducing mechanism that is nearest to the differential apparatus, the clutch can be arranged within a projection area of large-size parts, such as a ring gear of the differential apparatus, allowing the system to be entirely compact in size.

According to an $8^{th}$ aspect of the invention, in a power transmission system according to any of the $1^{st}$ to $7^{th}$ aspects, the speed-reducing mechanism and the differential apparatus are integrally arranged in a casing, whereby like effects to the $1^{st}$ to $7^{th}$ aspects can be achieved.

In addition, because the clutch is integrated with the speed-reducing mechanism and the differential apparatus, the power transmission system can be the more light-weighted, compact in size, and improved in vehicle-mountability.

Further, since the speed-reducing mechanism is integrated with the differential apparatus, the amount of oil to be supplied to the clutch is increased, allowing sufficient lubrication and cooling, and greatly improved durability, permitting a normal use to be near 100-% capacity.

Along therewith, the clutch can be made smaller in size, allowing the power transmission system to be the more light-weighted and compact in size.

According to a $9^{th}$ aspect of the invention, in a power transmission system according to the $8^{th}$ aspect, a final reduction gear set and a previous reduction gear set relative thereto are axially neighbored to each other, whereby like effects to the $8^{th}$ aspect can be achieved.

In addition, reduction gear can have a shorter support span, allowing adequate meshing of the gear, reduced vibration, and enhanced durability.

According to a $10^{th}$ aspect of the invention, in a power transmission system according to the $9^{th}$ aspect, the previous reduction gear set is disposed on an axially one side of the final reduction gear set, and the differential apparatus is disposed on an axially opposite side of the final reduction gear set, whereby like effects to the $9^{th}$ aspect can be achieved.

In addition, the casing which has the final reduction gear and the differential apparatus incorporated therein can have a controlled weight balance in a vehicle-transverse direction.

According to an $11^{th}$ aspect of the invention, in a power transmission system according to the $10^{th}$ aspect, the clutch is coaxially neighbored, at an axially outer side, to the differential apparatus, whereby like effects to the $10^{th}$ aspect can be achieved.

In addition, the casing can have a controlled weight balance in a vehicle-longitudinal direction also. Further, for the clutch to be set hardly receives restriction due to interference with peripheral members, flexibility of design is enhanced, such as in clutch capacity, clutch configuration, and condition for installation of an actuator.

According to a $12^{th}$ aspect of the invention, in a power transmission system according to the $7^{th}$ or $8^{th}$ aspect, the plurality of reduction gear sets of the speed-reducing mechanism is provided near a differential center of the differential apparatus, whereby like effects to the $7^{th}$ or $8^{th}$ aspect can be achieved.

In addition, because the reduction gear sets are arranged near the differential center of the differential apparatus, an entirety of power transmission system including the differential apparatus and the speed-reducing mechanism can be well-balanced.

In particular, in case the differential apparatus and the speed-reducing mechanism are separately fabricated and disposed to be adjacent with each other, a joint part between the differential apparatus and the speed-reducing mechanism is free from undue extra forces, as an advantage in strength, as well.

According to a $13^{th}$ aspect of the invention, in a power transmission system according to any of the $1^{st}$ to $8^{th}$ and $12^{th}$ aspects, the clutch comprises a frictional clutch, whereby like effects to the $1^{st}$ to $8^{th}$ and $12^{th}$ aspects can be achieved.

In addition, this arrangement of power transmission system is allowed to arbitrarily control transmission torque by regulating pressing forces of the frictional clutch.

Further, the use of a frictional clutch eliminates generation of ratchet sounds such as in meshing clutch for example, and high of calmness.

The use of a frictional clutch eliminates shocks and shock sounds in clutch connection and cancellation thereof.

The frictional clutch does not need synchronization of rotation in clutch connection and cancellation thereof, and can be fabricated at the lower cost.

According to a $14^{th}$ aspect of the invention, in a power transmission system according to the $13^{th}$ aspect, the frictional clutch comprises a multi-plate clutch, whereby like effects to the $13^{th}$ aspect can be achieved.

In addition, this arrangement of power transmission system using a multi-plate clutch is allowed to handle large drive power, because the multi-plate clutch can use wide frictional surface areas to obtain a sufficient capacity even if compact in size.

Moreover, by making the multi-plate clutch compact, the power transmission system can be the more light-weighted, compact in size, and improved in vehicle-mountability.

Further, because the clutch plates can be easily changed in number and diameter to thereby adjust the capacity, there is great flexibility in design.

According to a $15^{th}$ aspect of the invention, in a power transmission system according to the $13^{th}$ aspect, the frictional clutch comprises a cone clutch, whereby like effects to the $13^{th}$ aspect can be achieved.

In addition, because the cone clutch is simple in structure and small of components, the power transmission system can be the more light-weighted, compact in size, improved in vehicle-mountability, and reduced in cost.

According to a $16^{th}$ aspect of the invention, in a power transmission system according to any of the $1^{st}$ to $8^{th}$ and $12^{th}$ aspects, the clutch comprises a meshing clutch, whereby like effects to the $1^{st}$ to $8^{th}$ and $12^{th}$ aspects can be achieved.

In addition, because the meshing clutch is free from dragging torque due such as to viscosity of oil, unlike the frictional clutches, the loss of drive power is little, allowing for the electric motor to be improved in durability.

Because of unnecessary countermeasures such as lowering oil viscosity, raising temperature, and reducing amount of oil for the dragging torque to be reduced, implementation can be the more reduced in cost.

Moreover, when the clutch is disconnected, the electric motor is not mechanically rotated by dragging torque, protection performances such as of a battery, alternator, and circuit elements can be improved, as well as durability of the electric motor.

Further, this arrangement of power transmission system employs a meshing clutch which can provide a compact size with a great capacity, allowing for great drive power to be handled.

Still more, because the meshing clutch is simple in structure and small of component number, the power transmission system can be the more light-weighted, compact in size, and improved in vehicle-mountability, with a low cost.

According to a $17^{th}$ aspect of the invention, in a power transmission system according to the $16^{th}$ aspect, the meshing clutch comprises a dog clutch, whereby like effects to the $16^{th}$ aspect can be achieved.

In addition, because the dog clutch does not need connection members such as coupling sleeve to be moved between meshing teeth for engagement or disengagement, the structure is by far simple and low of cost. Moreover, as a narrow installation space can do, this arrangement of power transmission system is allowed to have a clutch portion the more simplified in structure, reduced in cost, and compact in size.

According to an $18^{th}$ aspect of the invention, in a power transmission system according to any of the $1^{st}$ to $8^{th}$ and $12^{th}$ aspects, the clutch comprises a one-way clutch, whereby like effects to the $1^{st}$ to $8^{th}$ and $12^{th}$ aspects can be achieved.

In addition, when connection is canceled, the one-way clutch is free from rotational resistance such as by dragging torque in frictional clutch, and in this arrangement of power transmission system using a one-way clutch, the electric motor in a stopped state is prevented from being rotated, with the more improved durability.

Because the one-way clutch does not need an operation mechanism nor control mechanism therefor, the above arrangement of power transmission system is the more simplified, light-weighted, and compact in size.

By use of a small-sized lightweight one-way clutch, the above arrangement of power transmission system can be more light-weighted and compact.

Further, in application such as to a four-wheel driven electric automobile using an electric motor as an auxiliary drive power source, the one-way clutch may be arranged to be connected when the vehicle runs forward, so that upon rotation of the electric motor associated wheels are driven via the one-way clutch, allowing for the vehicle to have improved abilities such as when starting or in acceleration, or to run over differences in level, cavities in road, etc.

Still more, when rotation of the electric motor is stopped, the vehicle enters a two-wheel driven state. In this state, connection of the one-way clutch is canceled by preceding rotation of associated wheels, of which rotating actions otherwise might have forced the electric motor to rotate, but now are isolated from the electric motor.

Like this, the electric motor is prevented against such forced rotation, to be free from burdens that otherwise might have been imposed to produce emf, such as on a battery, alternator, circuit elements, etc, and is allowed to have an enhanced durability.

According to a $19^{th}$ aspect of the invention, in a power transmission system according to any of the $1^{st}$ to $8^{th}$ and $12^{th}$ aspects, the clutch comprises a two-way clutch in which canceling directions of relative rotations are switchable, whereby like effects to the $1^{st}$ to $8^{th}$ and $12^{th}$ aspects can be achieved.

In addition, in this arrangement of power transmission system using a two-way clutch, the electric motor can be prevented from being forced to rotate by wheels, in both forward run and backward run.

Therefore, it can cope with a rollback of the vehicle, allowing for enhanced protection to be effected, such as of the electric motor, a battery, an alternator, associated circuit elements, etc.

Unlike the case of using a one-way clutch that needs another clutch for backward run and an extra controller for necessary connection in the backward run and disconnection for forward run, the above arrangement of power transmission sytem using a two-way clutch, coping also with backward run as described, does not need the clutch for backward run nor the extra controller, and is allowed to be the more simplified in structure, light-weighted, compact, and improved in vehicle-mountability, with a low cost.

Further, this arrangement of power transmission system has like effects to the $18^{th}$ aspect using a one-way clutch.

According to a $20^{th}$ aspect of the invention, in a power transmission system according to any of the $1^{st}$ to $8^{th}$ and $12^{th}$ aspects, the clutch comprises a centrifugal clutch, whereby like effects to the $1^{st}$ to $8^{th}$ and $12^{th}$ aspects can be achieved.

In a four-wheel driven electric automobile employing both a main drive power source (engine) and an electric motor, the centrifugal clutch is disposed on a driving end, and the electric motor is controlled so as to start when the centrifugal clutch is connected.

When the vehicle is stopped (to start) or when the vehicle speed is decreased so that wheel revolution speed becomes lower than a critical value, the centrifugal clutch is connected, and the electric motor is started, driving wheels via the centrifugal clutch, rendering the vehicle four-wheel driven.

If the vehicle speed is increased so that the wheel revolution speed reaches critical value, the centrifugal clutch is operated for clutch cancellation, when rotation of the electric motor is stopped to render the vehicle two-wheel driven from the engine.

Like this, because forced rotation by the vehicle is isolated from the electric motor by use of the centrifugal clutch, the electric motor is prevented against such forced rotation, to be free from burdens that otherwise might have been imposed to produce emf, such as on a battery, alternator, circuit elements, etc, and is allowed to have an enhanced durability.

In addition, when the connection is cancelled, as the centrifugal clutch is free from rotational resistance unlike the frictional clutch subjected to dragging torque, the above arrangement of power transmission system using a centrifugal clutch have the more improved effects, such as on fuel consumption (when two-wheel driven) with rotation of the electric motor stopped, or on durability of the motor.

In addition, in this arrangement of power transmission system using a centrifugal clutch, the electric motor can be kept from being forced to rotate by wheels, in both forward run and backward run, permitting effective protection such as of battery, alternator, and circuit elements.

Because the centrifugal clutch does not need an operation mechanism nor control mechanism therefor, the above arrangement of power transmission system is the more simplified, light-weighted, and compact in size.

By use of a small-sized lightweight centrifugal clutch, the above arrangement of power transmission system can be more light-weighted and compact, allowing for great drive power to be handled.

Further, to achieve the object described, according a $21^{st}$ aspect of the invention, there is provided an operation method for a power transmission system according to any of the $16^{th}$ to $20^{th}$ aspects, the method comprising the step of canceling connection of the clutch, switching a rotating direction of the electric motor, thereby causing a contact portion of the clutch to vibrate so that the contact portion has a reduced frictional resistance.

Like this, when canceling connection of the clutch, the direction of rotation of the electric motor is switched to give vibration to a contact portion of the clutch so that the contact portion has a reduced frictional resistance, thereby allowing connection and cancellation, such as of a meshing clutch, one-way clutch, two-way clutch, or centrifugal clutch, to be properly effected, when intended, or at a predetermined vehicle speed.

Like this, there can be maintained protection functions to be high, such as of an electric motor, battery, alternator, and circuit elements in a power transmission system according to any of the $16^{th}$ to $20^{th}$ aspects.

Further, a four-wheel driven state of the vehicle can be changed to a two-wheel driven state, as necessary, with enhanced maneuverability.

According to a $22^{nd}$ aspect of the invention, there is provided an operation method for a power transmission system according to any of the $16^{th}$ to $20^{th}$ aspects, the method comprising the step of canceling connection of the clutch, changing a revolution number of the electric motor so that a contact portion thereof has a reduced frictional resistance, whereby like effects to the $21^{st}$ aspect can be achieved.

BRIEF DESCRIPTION OF THE ACCOMPANYING DRAWINGS

The above and further objects and novel features of the present invention will more fully appear from the following detailed description when the same is read in conjunction with the accompanying drawings, in which.

Figure 9:
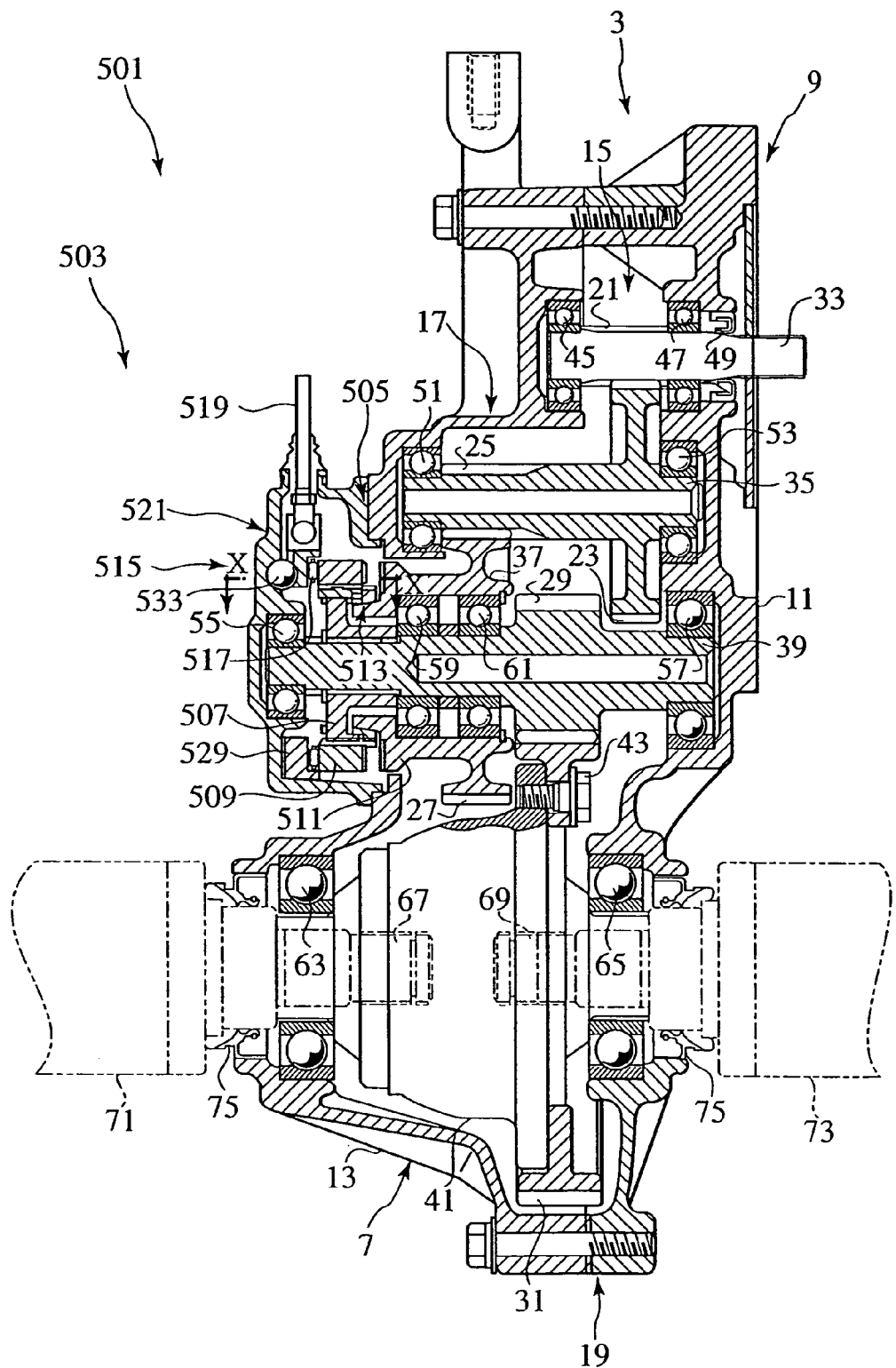
FIG. 9 is a sectional view of an essential portion of a power train system including a power transmission system according to a fifth embodiment of the invention.
Figure 11:
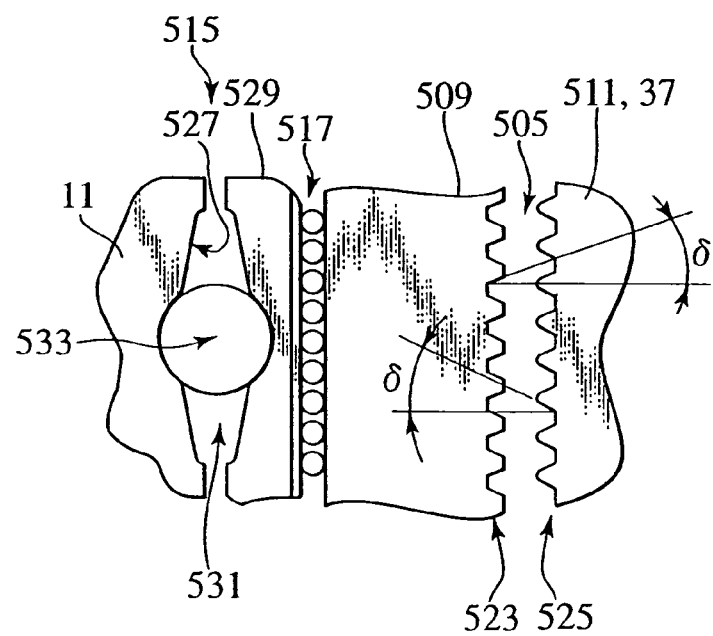
Figure 12:
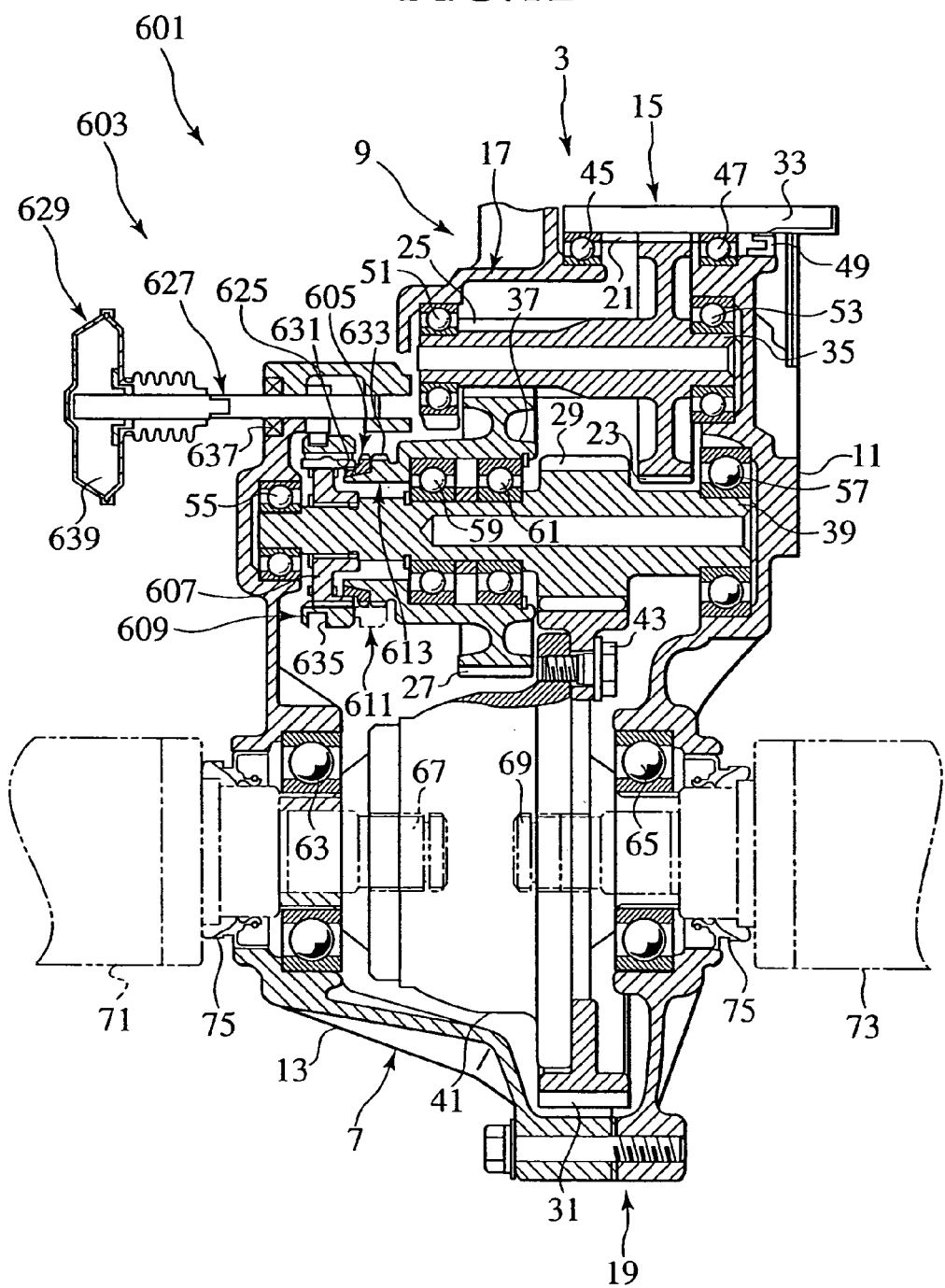
Figure 13:
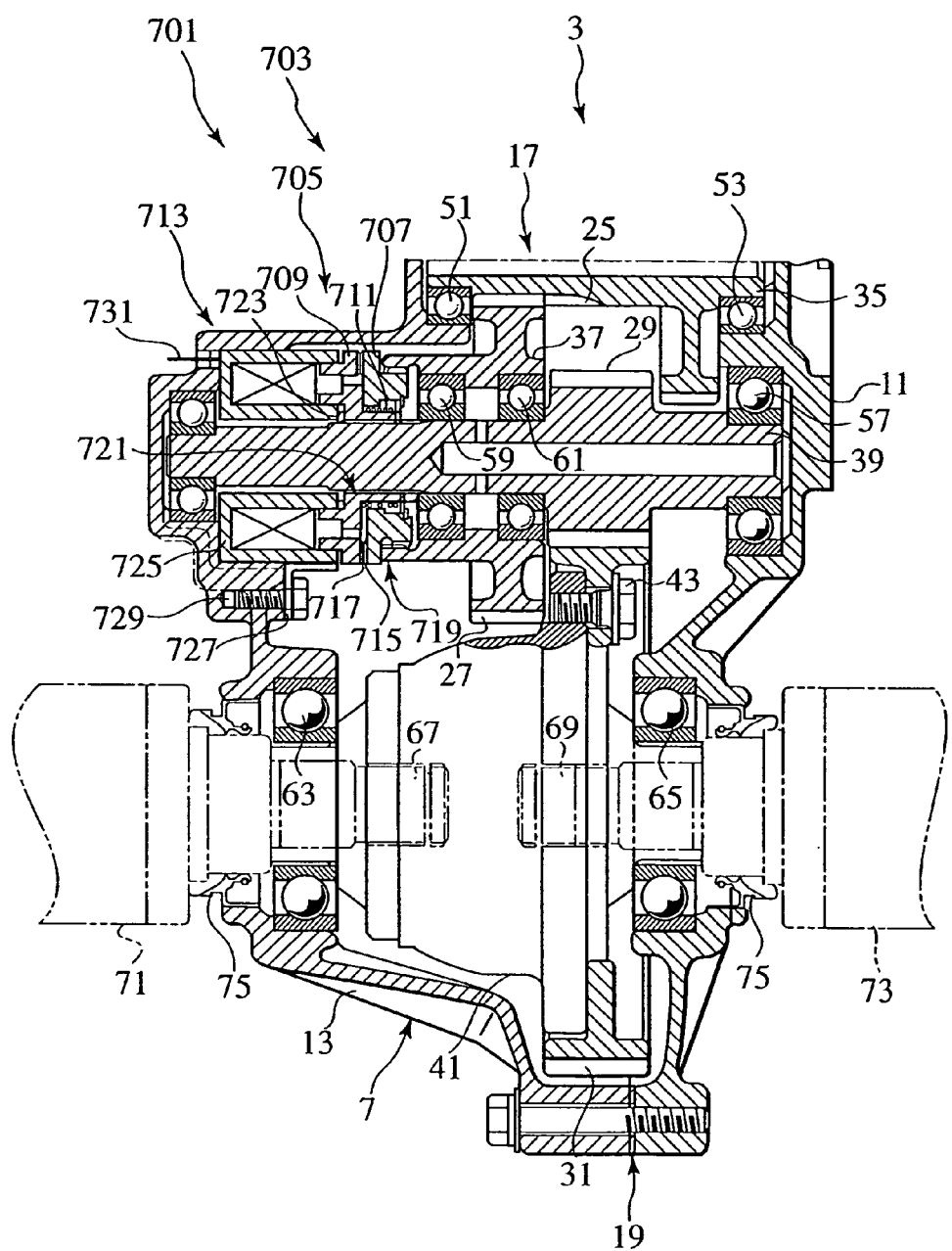
Figure 14:
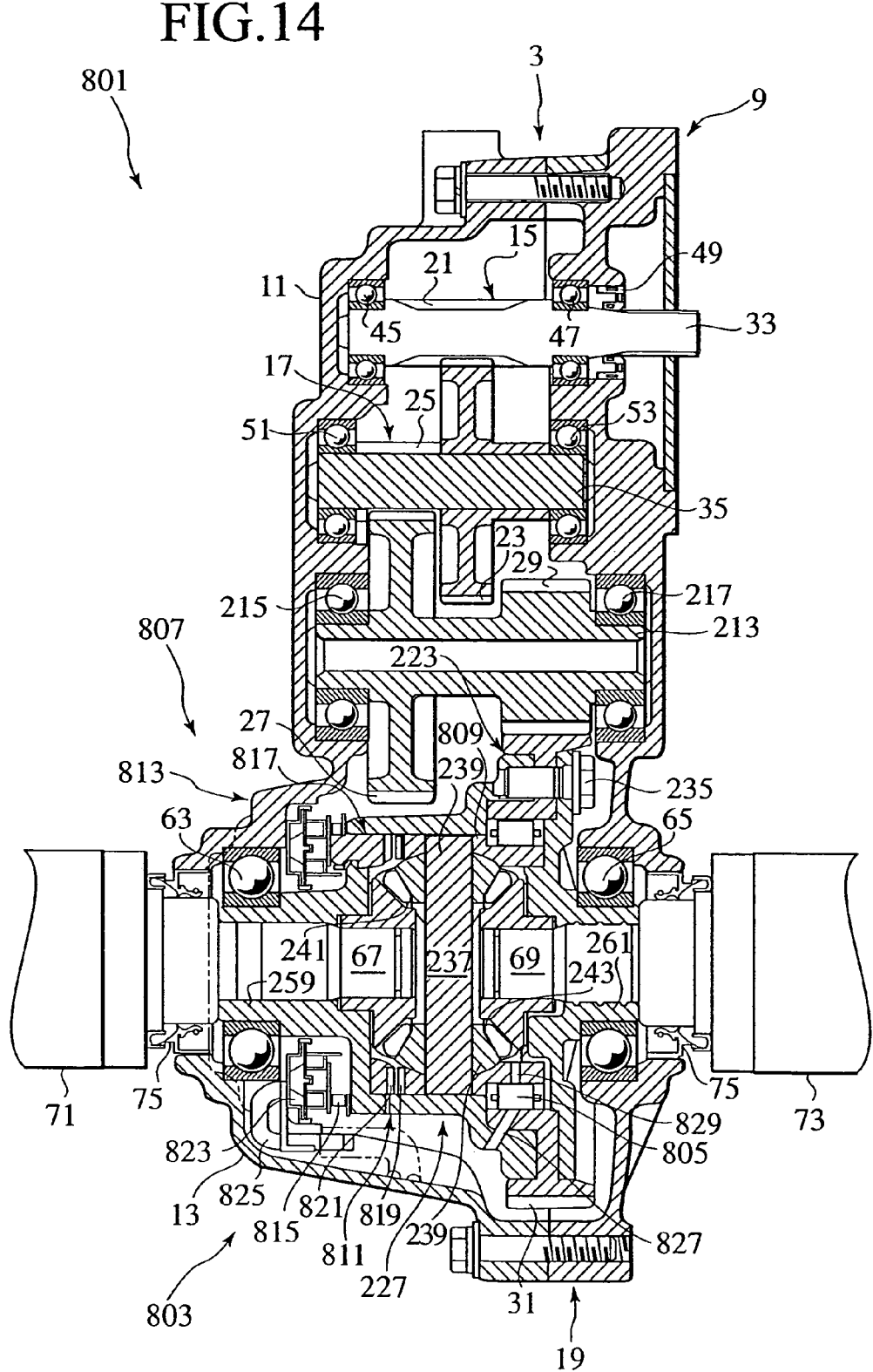
Figure 15:
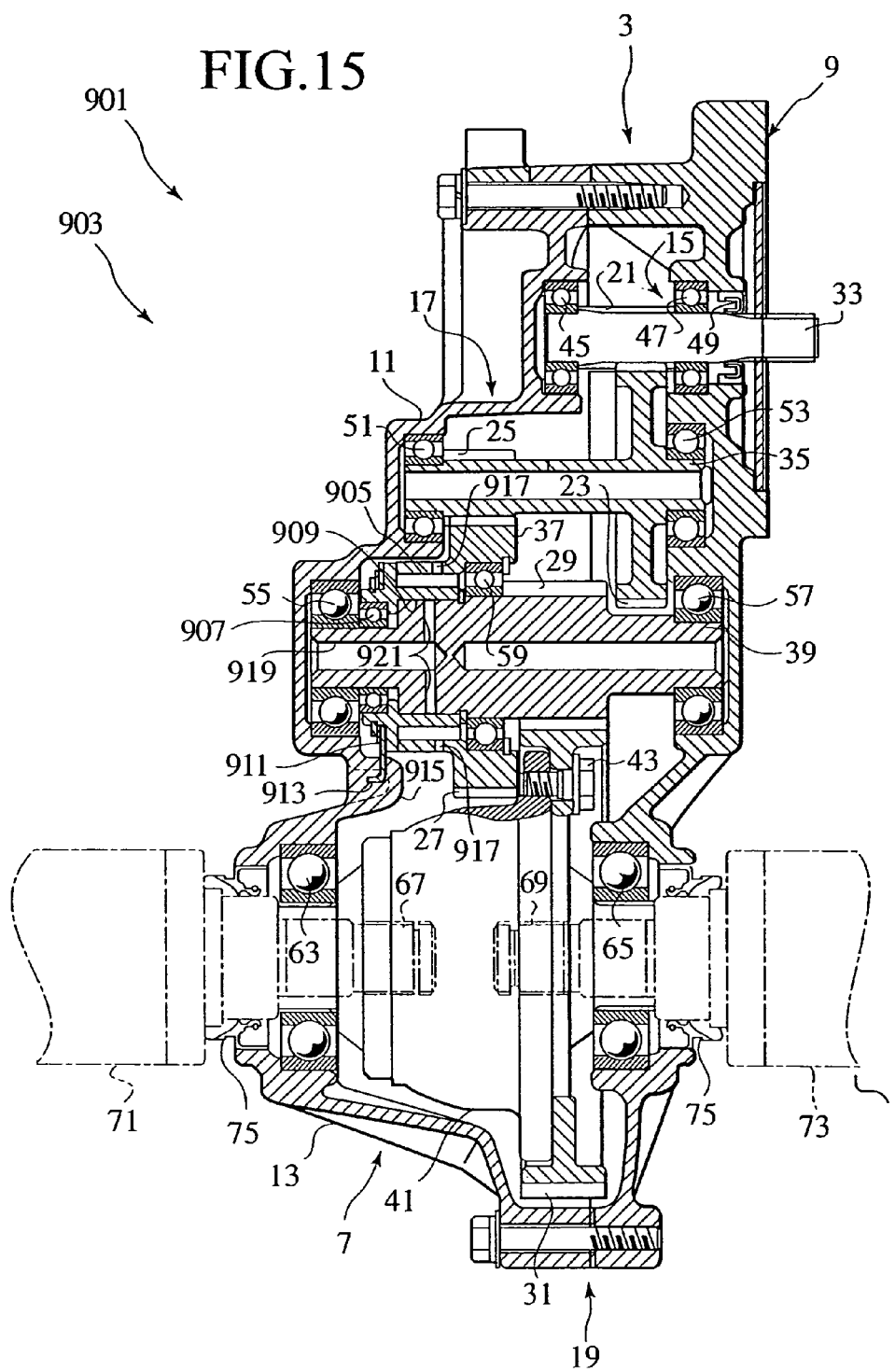
Figure 16:
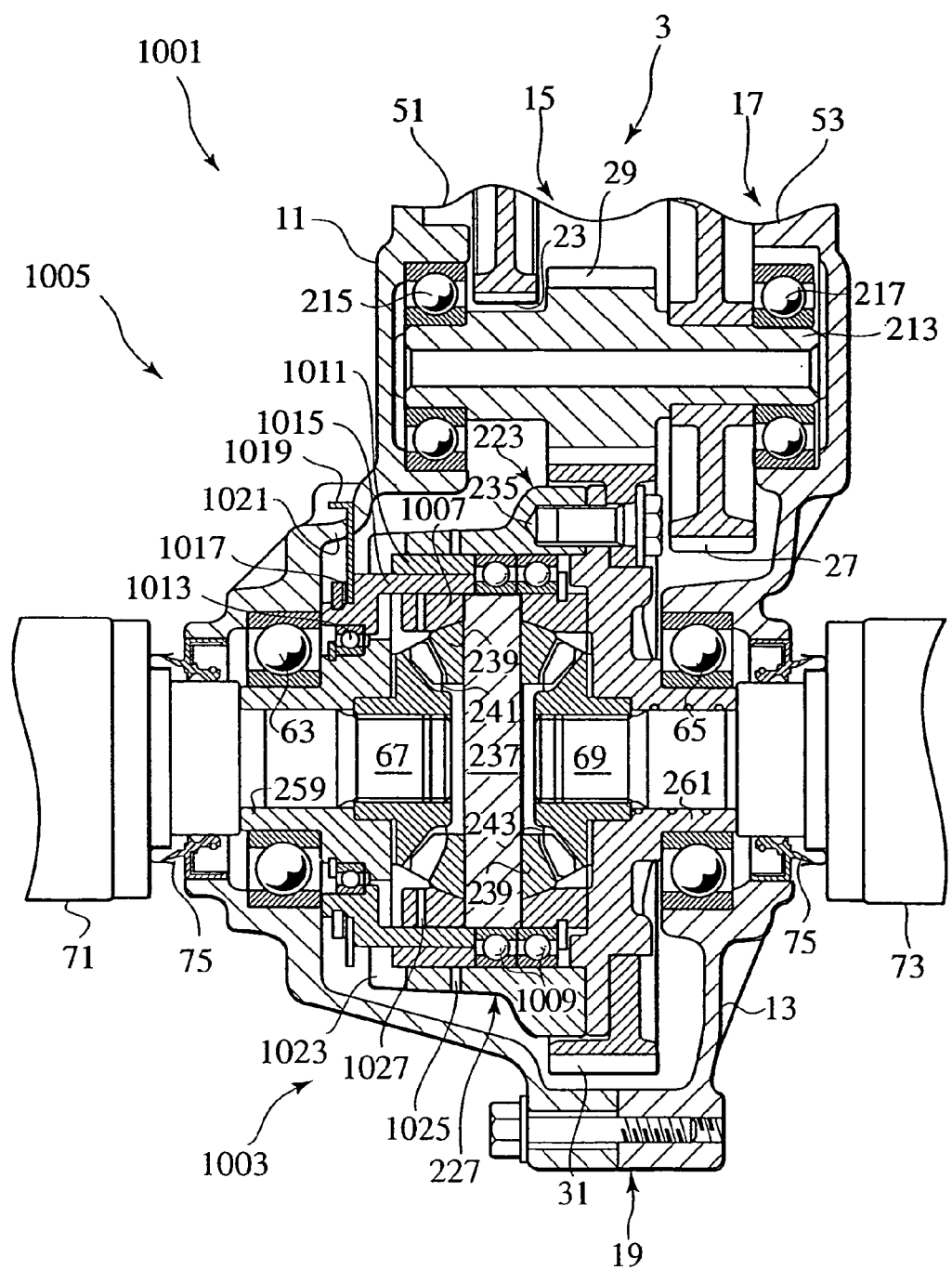
Figure 17:
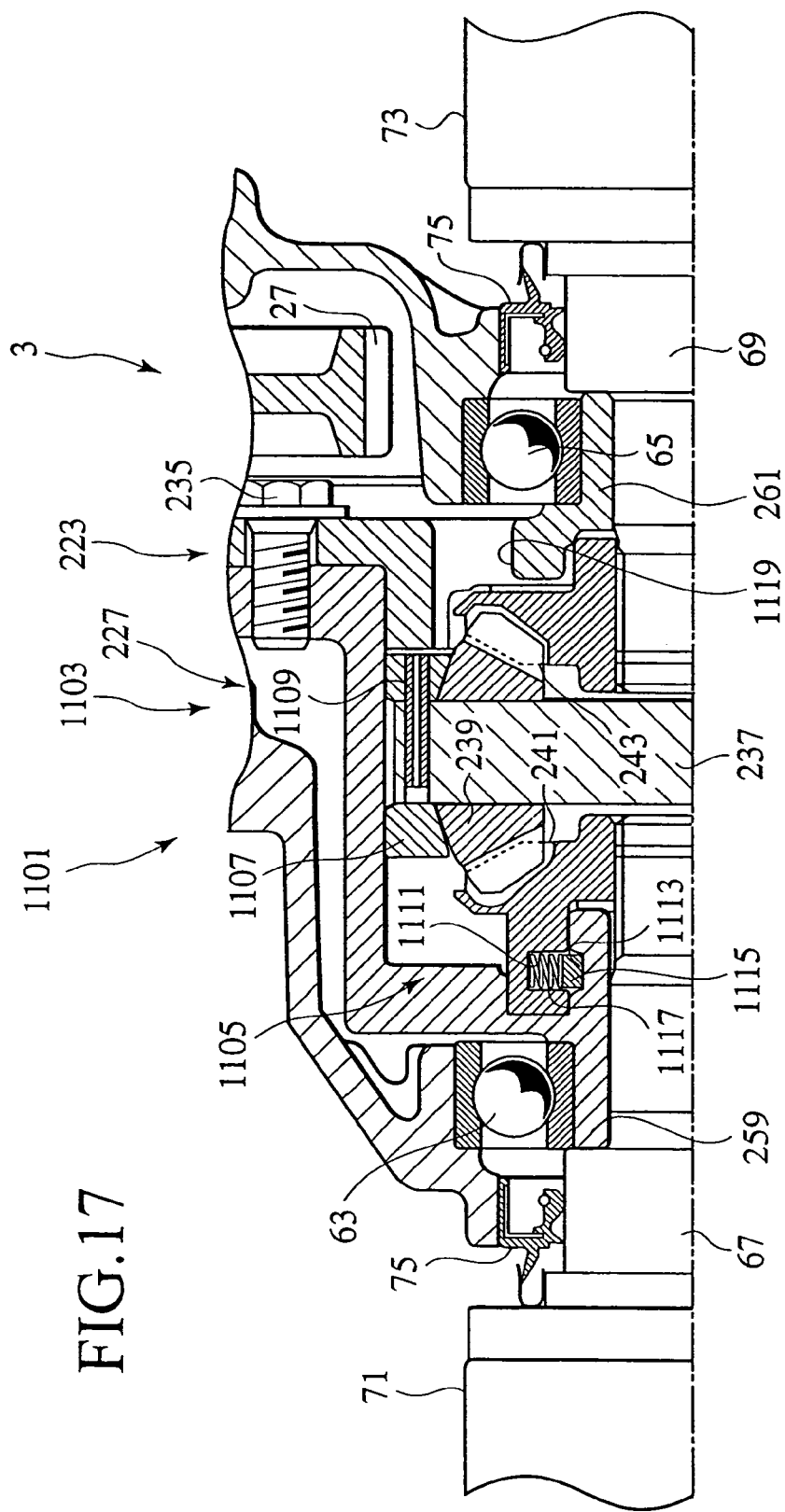
Figure 18:
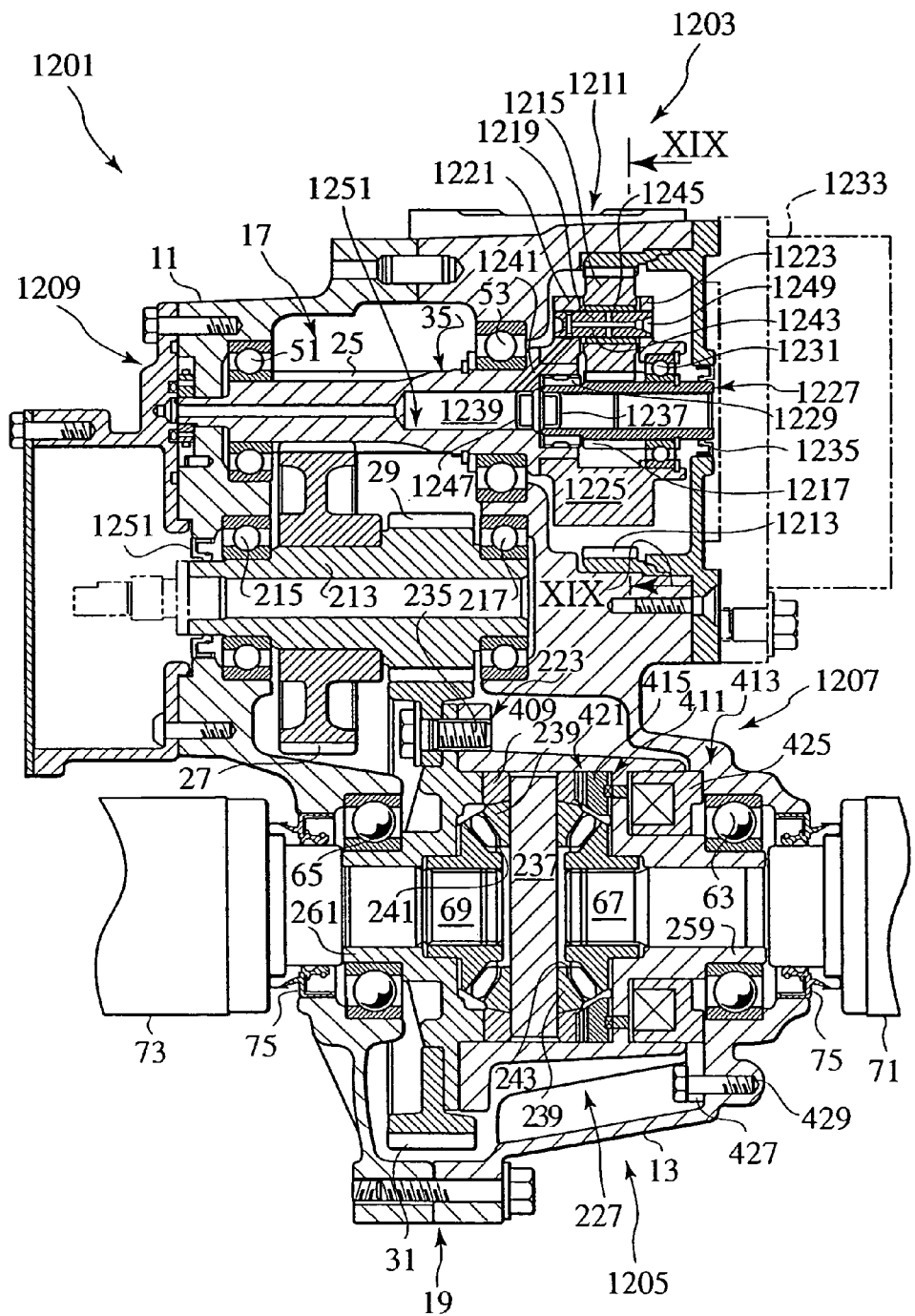
Figure 19:
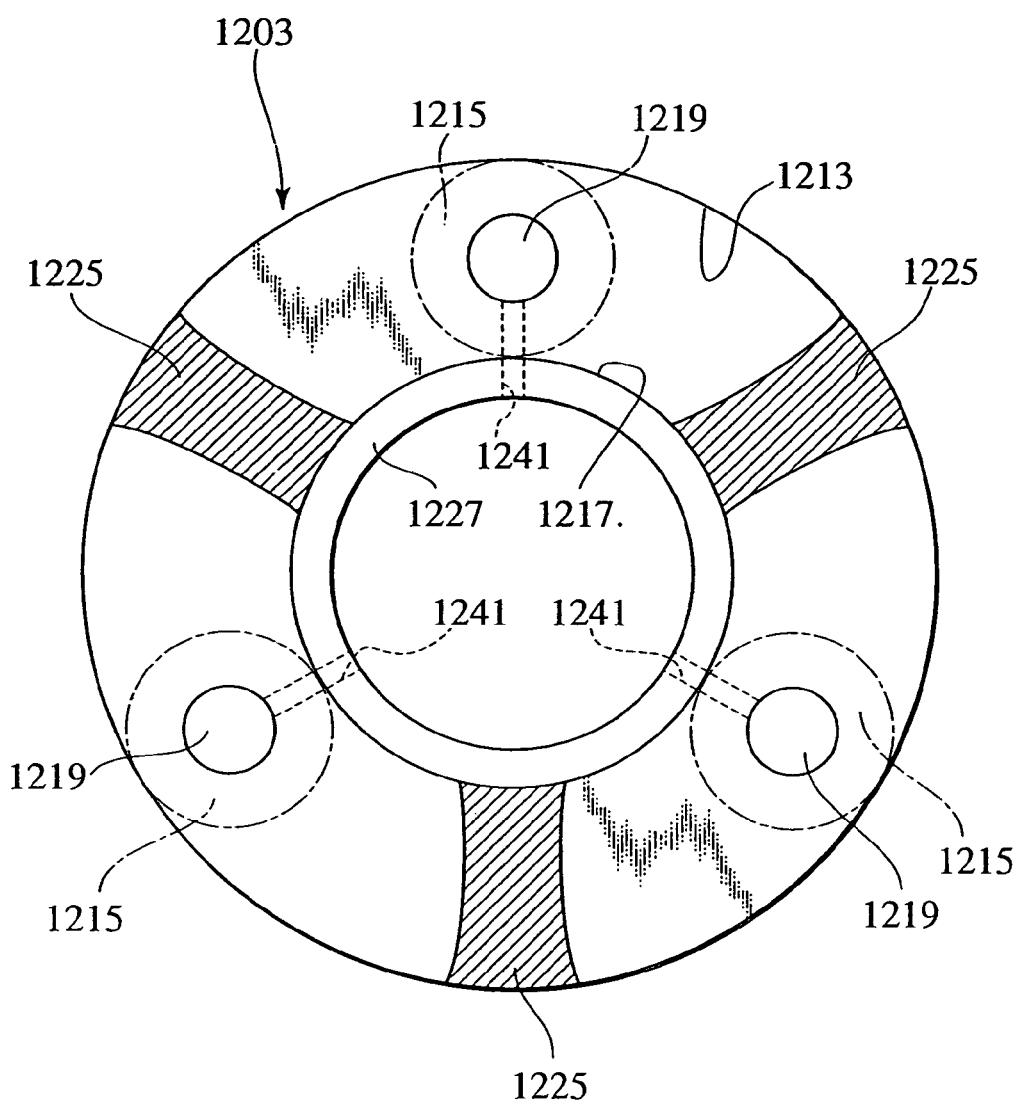
Figure 20:
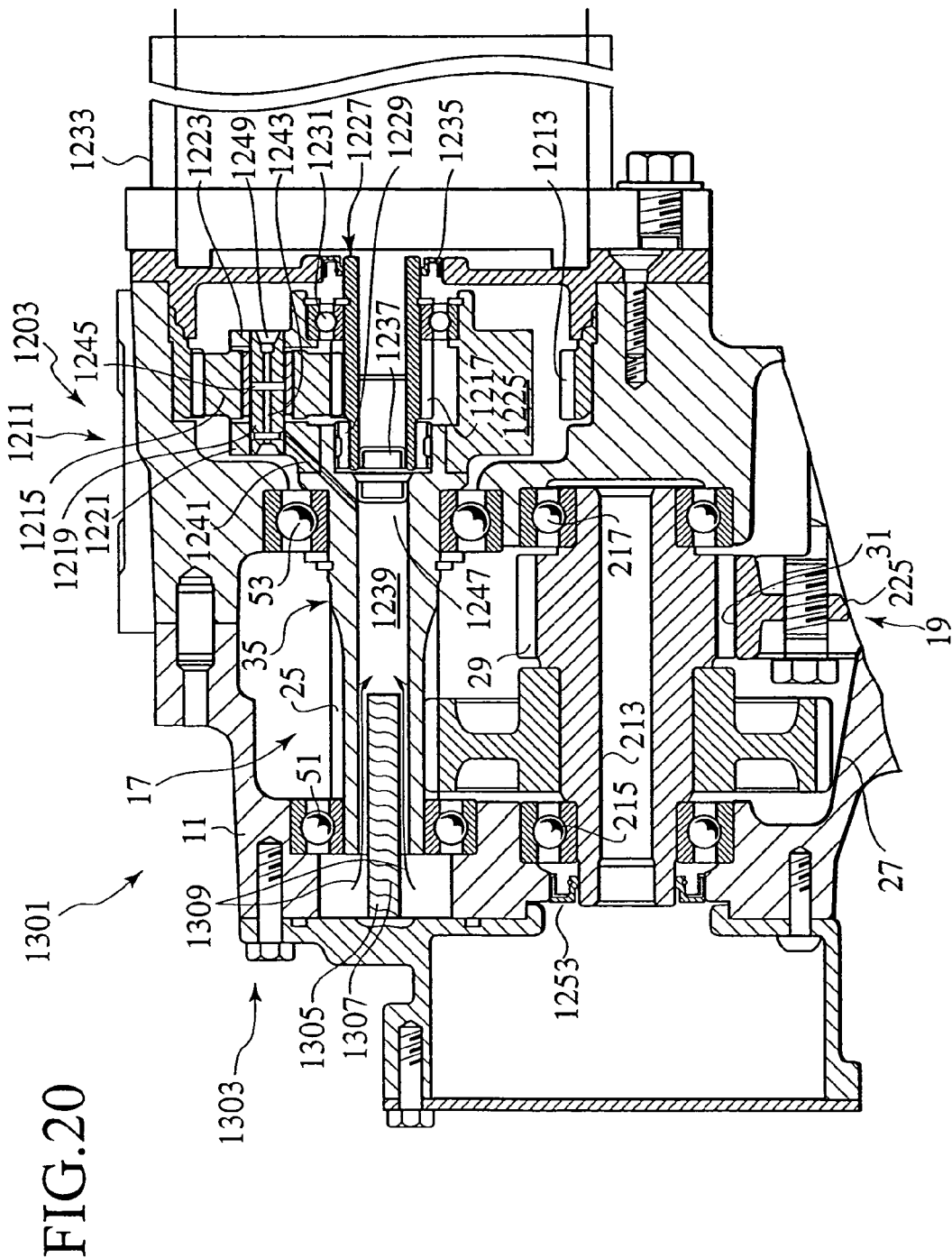
Figure 21:
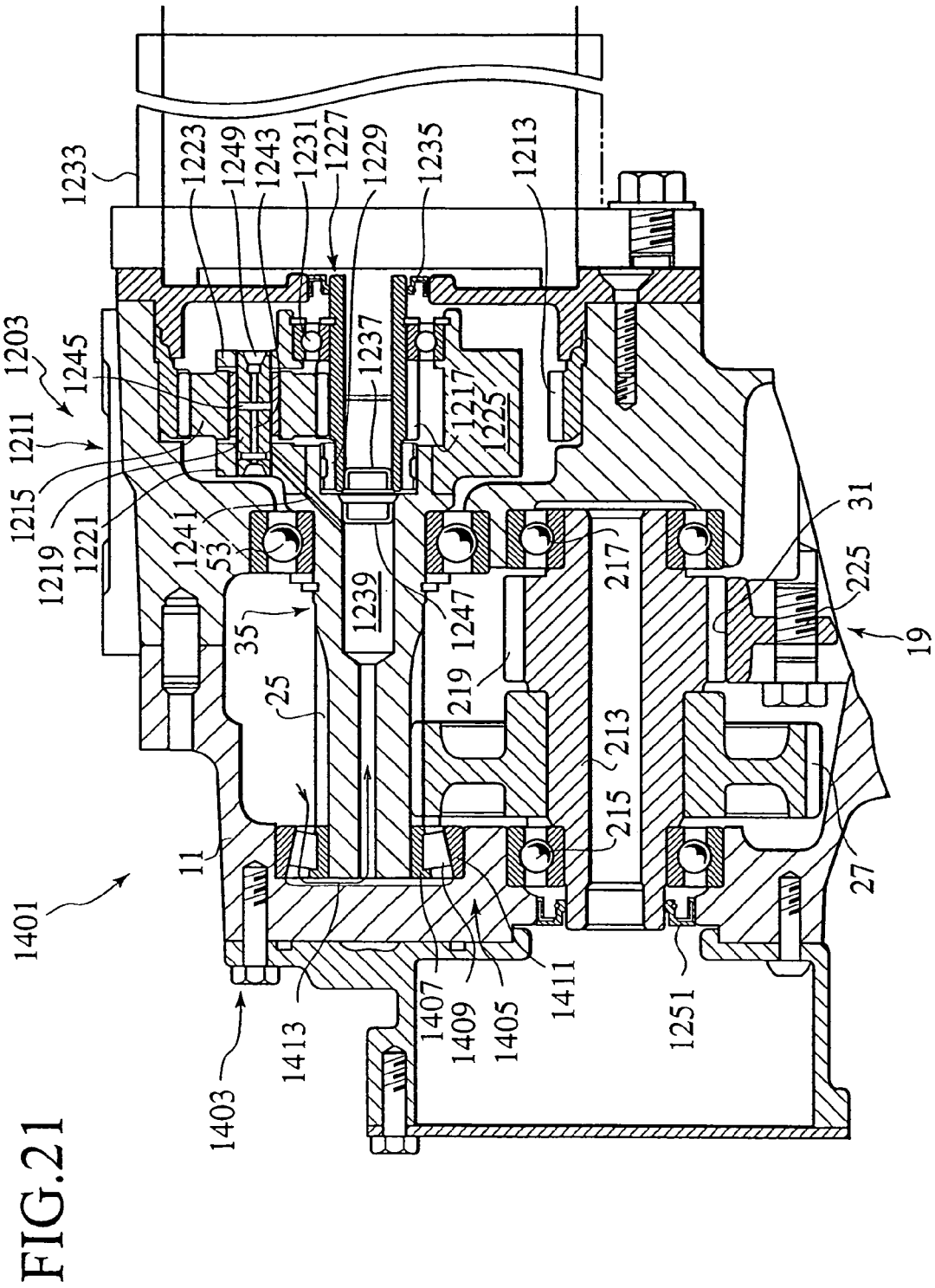
Figure 22:
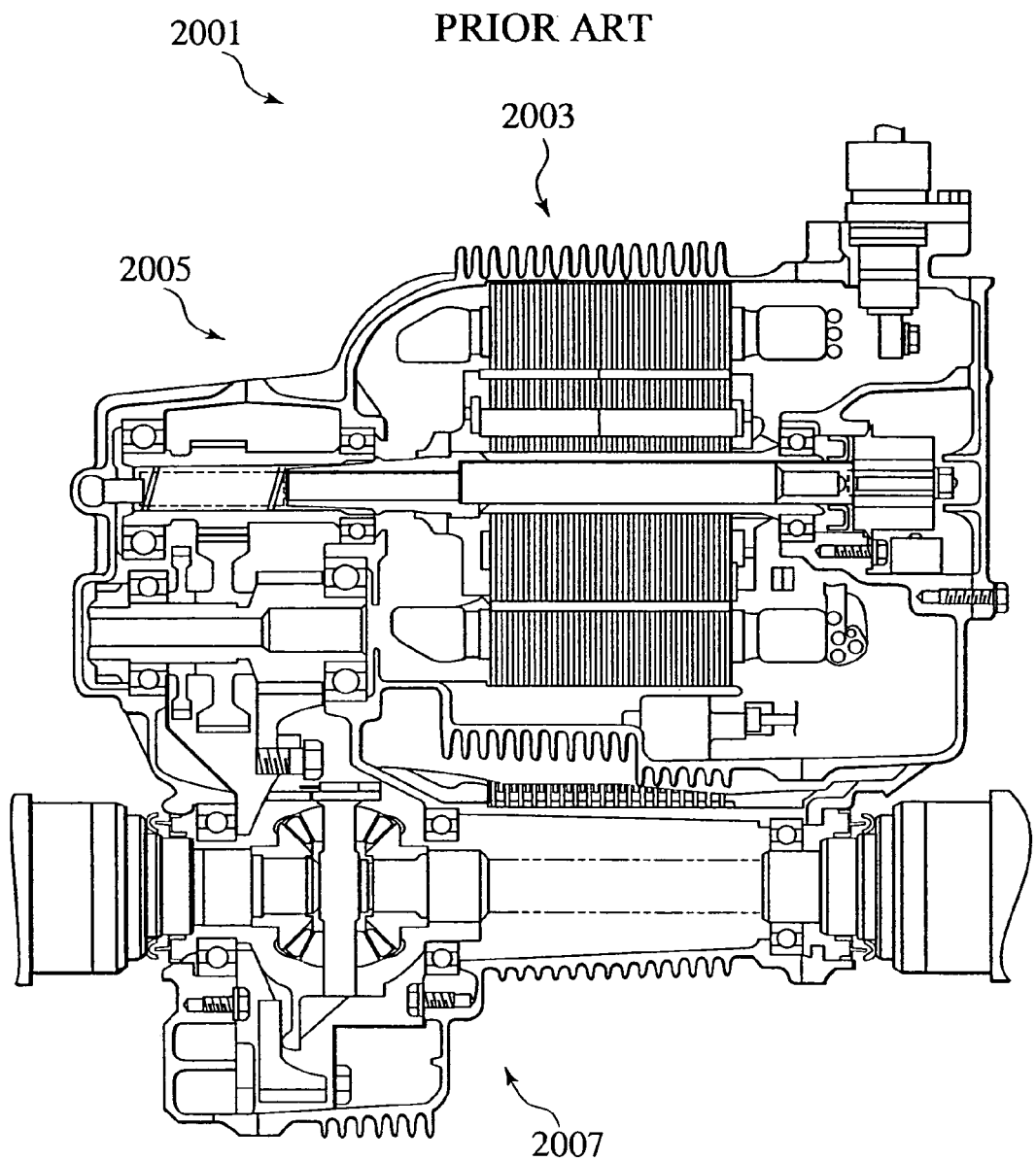
Figure 23:
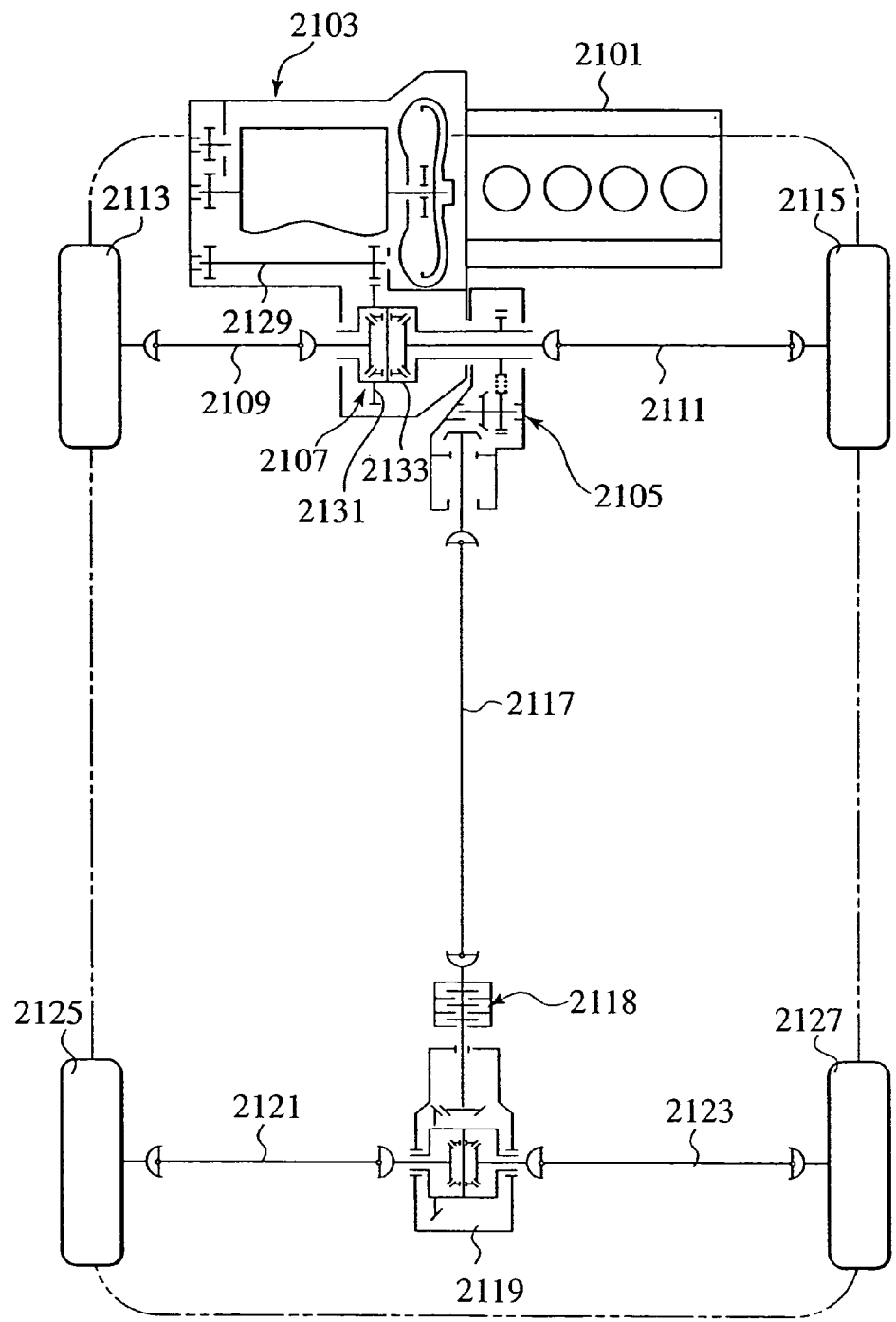

FIG. 11 also is a section along line X—X of FIG. 9;

FIG. 12 is a sectional view of an essential portion of a power train system including a power transmission system according to a sixth embodiment of the invention;

FIG. 13 is a sectional view of an essential portion of a power train system including a power transmission system according to a seventh embodiment of the invention;

FIG. 14 is a sectional view of an essential portion of a power train system including a power transmission system according to an eighth embodiment of the invention;

FIG. 15 is a sectional view of an essential portion of a power train system including a power transmission system according to a ninth embodiment of the invention;

FIG. 16 is a sectional view of an essential portion of a power train system including a power transmission system according to a tenth embodiment of the invention;

FIG. 17 is a sectional view of an essential portion of a power train system including a power transmission system according to an eleventh embodiment of the invention;

FIG. 18 is a sectional view of an essential portion of a power train system including a power transmission system according to a twelfth embodiment of the invention;

FIG. 19 is a section along line XIX—XIX of FIG. 18:

FIG. 20 is a sectional view of an essential portion of a power train system including a power transmission system according to a thirteenth embodiment of the invention;

FIG. 21 is a sectional view of an essential portion of a power train system including a power transmission system according to a fourteenth embodiment of the invention;

FIG. 22 is a sectional view of an essential portion of a conventional power train system including a power transmission system; and FIG. 23 is a skeleton diagram of the conventional power train system.

DETAILED DESCRIPTION OF THE PREFERRED EMBODIMENTS

There will be detailed below 14 preferred embodiments of the present invention with reference to the accompanying drawings. Like members are designated by like reference characters.

In the embodiments, the term "differential center" means a middle position of a differential apparatus between left and right meshing parts at which left and right output gears (side gears) engage with left and right output shafts, respectively. For example, in the case of a differential apparatus using a bevel gear, the differential center is located on a shaft axis center of pinion shafts, that is a center point of pinion shafts in a rotation shaft direction of the differential apparatus.

It is noted that in the drawings, sectional views represent sections along planes intersecting at an angle. It may be necessary for a casing to be compact in size to position a later-described second shaft at an even or higher level to or than a differential shaft, while a later-described first shaft and electric motor may well be located lower. The casing has lubricant oil filled to a sufficient level for the second shaft to be well lubricated.

First Embodiment

Figure 1:
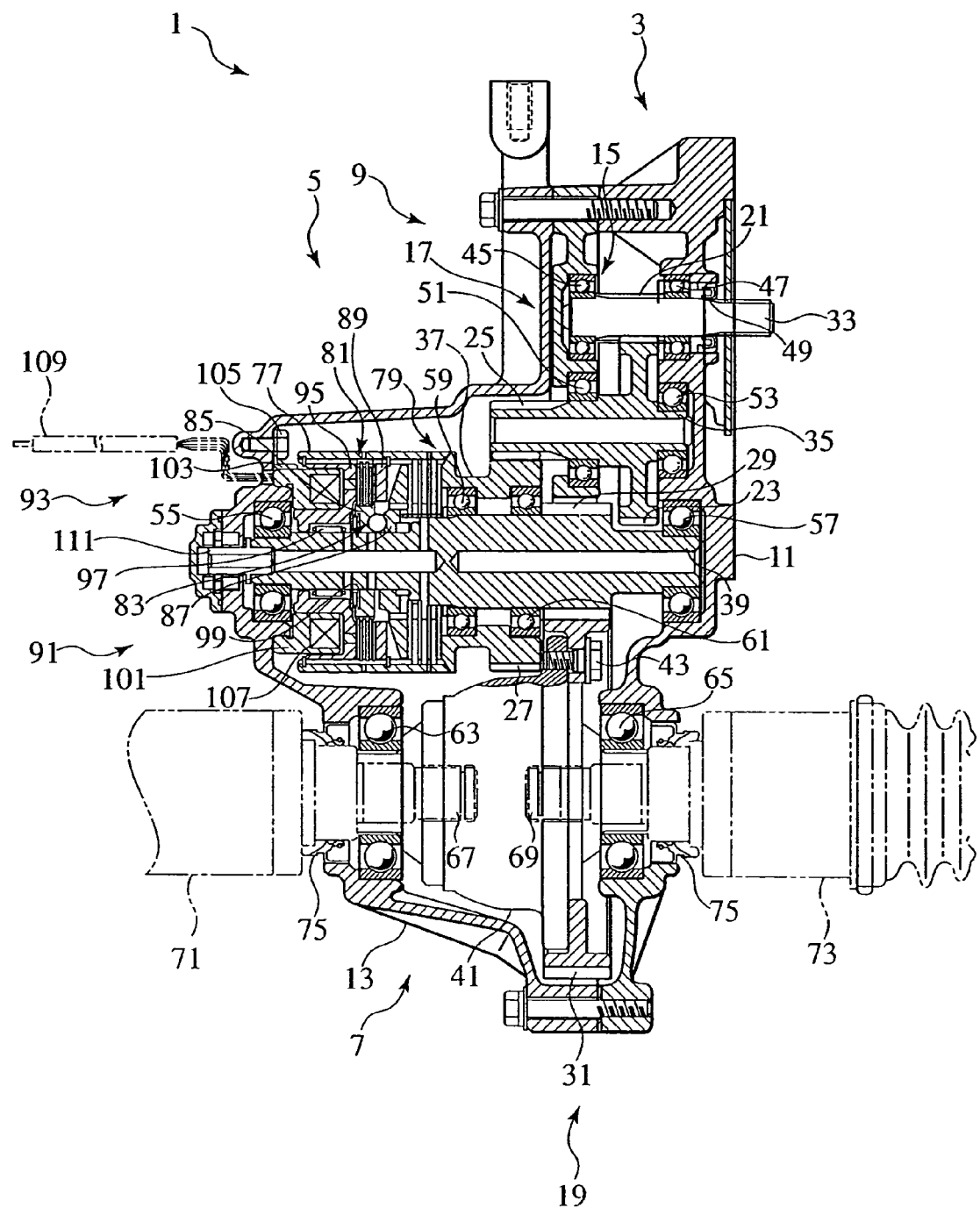
FIG. 1 is a sectional view of an essential portion of a power train system including a power transmission system according to a first embodiment of the invention.
Figure 2:
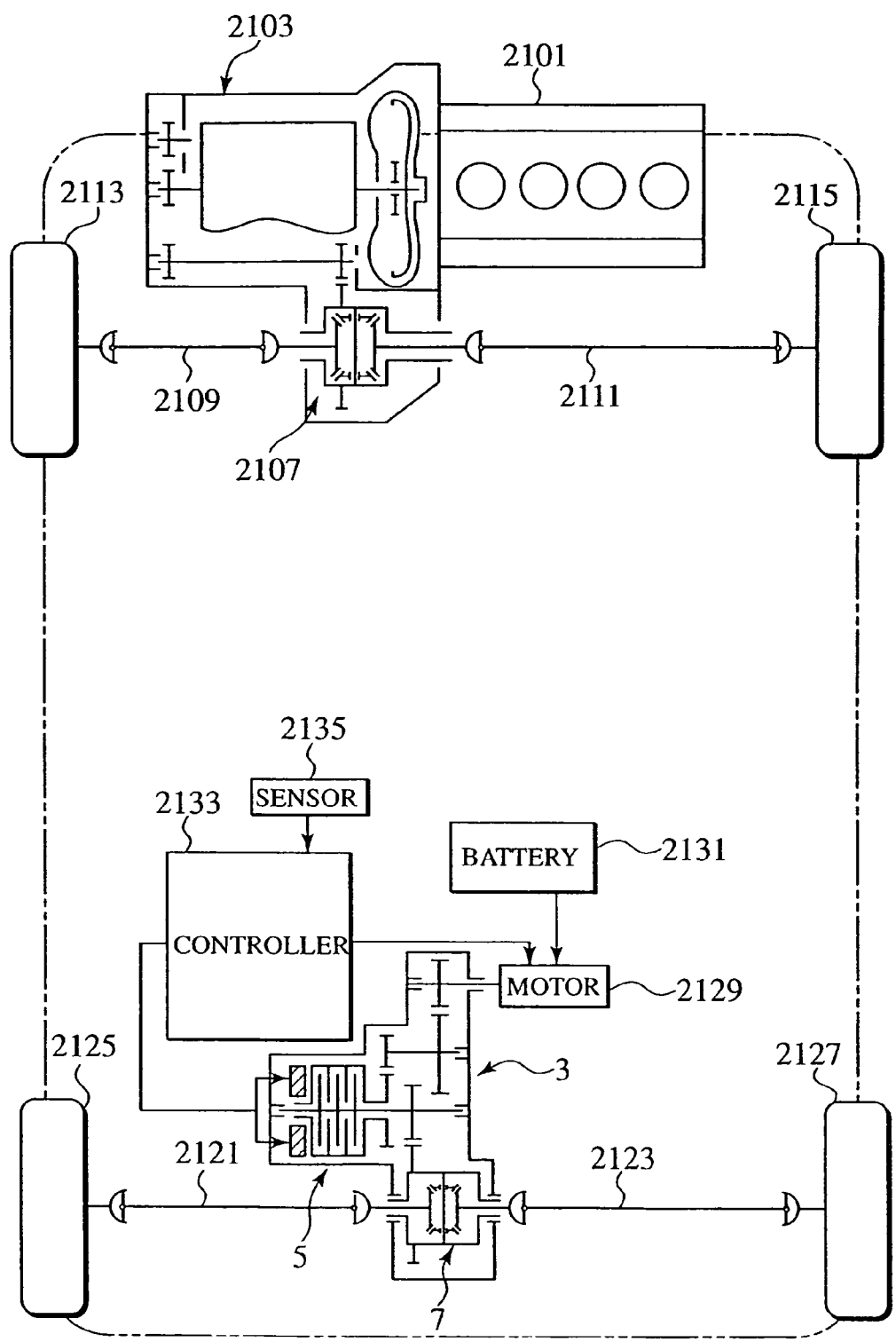
FIG. 2 is a skeleton diagram of the power train system.

FIG. 1 and FIG. 2 show a transmission system 1 of drive power of an electric motor according to the first embodiment of the invention.

The power transmission system 1 has features of the $1^{st}$, $2^{nd}$, $6^{th}$, $7^{th}$, $8^{th}$, $12^{th}$, $13^{th}$, and $14^{th}$ aspects of the invention. Note the terms "transverse", "left" and "right" mean those of a vehicle equipped with the power transmission system 1, and those in FIG. 1.

The power transmission system 1 is configured to be arranged on a rear wheel side of a four wheel driven vehicle using an engine and an electric motor, such as an 35 electric automobile shown in FIG. 2, for example.

This vehicle is equipped with a power train system which has: a front-wheel side power train including a transversely arranged engine 2101, a transmission 2103, a front differential 2107 (as a differential apparatus for distributing drive power of the engine 2101 to left and right front wheels), left and right front axles 2109 and 2111, and left and right front wheels 2113 and 2115; and a rear-wheel side power train including a sensor 2135 for detecting necessary data, a controller 2133 responsible for data input from the sensor 2135 to provide necessary control commands, an electric motor 2129 controlled with a control command of the controller 2133 to provide drive torque, a battery 2131 as a secondary cell for supplying electric power to the motor 2129, a speed-reducing mechanism 3 connected to the motor 2129, a rear differential 7 connected via left and right rear axles 2121 and 2123 to left and right rear wheels 2125 and 2127, and an on-off clutch 5 responsible for another command of the controller 2133 to be engaged and disengaged for interconnection between the speed-reducing mechanism 3 and the rear differential 7.

The sensor 2135 may detect data on an rpm of the eigine 2101, a travelling speed of the vehicle, and an rpm of some wheel to thereby calculate a slip of the wheel, and the controller 2133 may be responsible for any of an excessive slip and manual commands from a driver to select an adequate control command.

For normal run, the front wheels 2113 and 2115 are always driven from the engine 2101, and when necessary, the rear wheels 2125 and 2127 are auxiliarily driven from the electric motor 2129.

Structure of the power transmission system 1 will then be detailed with reference to FIG. 1.

The power transmission system 1 is constituted with the speed-reducing mechanism 3, the on-off clutch 5 (as a clutch) to be electromagnetically controlled, the rear differential 7 (as a differential apparatus), the controller 2133, etc.

The power transmission system 1 is accommodated in a casing 9, which is constituted as a combination of a gear casing part 11 for accommodating the speed-reducing mechanism 3 and the on-off clutch 5, and a differential carrier part 13 for accommodating the rear differential 7.

The casing 9 is provided with an oil sump.

The speed-reducing mechanism 3 is constituted with a first shaft 33, a second shaft 35, and a third shaft (37+39), which are provided with three stages of reduction gear sets 15, 17, and 19.

The third shaft is a combination of mutually coaxially arranged outer and inner shafts 37 and 39.

The reduction gear set 15 is a combination of reduction gears 21 and 23. The reduction gear set 17 is a combination of reduction gears 25 and 27. The reduction gear set 19 is a combination of reduction gears 29 and 31.

More specifically, one reduction gear 21 of the reduction gear set 15 is formed on an axially central part of the first shaft 33, and the other reduction gear 23 of the gear set 15 is formed on a right part of the second shaft 35.

One reduction gear 25 of the reduction gear set 17 is formed on a left part of the second shaft 35, and the other reduction gear 27 of the gear set 17 is formed (as a drive power transmitting member) on the outer shaft 37 of a hollowed configuration.

One reduction gear 29 of the reduction gear set 19 is formed (as a drive power transmitting member) on a right part of the inner shaft 39. The other reduction gear 31 of the gear set 19 is configured as a ring gear to be fixed by bolts 43 to a differential casing 41 of the rear differential 7.

Like this, the reduction gear sets 15, 17, and 19 have a staggered structure, whereby they can be disposed near a plane centered to the rear differential 7.

The first shaft 33 is supported at its left end and central part by the gear casing part 11 via left and right ball bearings 45 and 47 respectively interposed therebetween, and is operatively connected at its right end to an output shaft of the rear-wheel driving electric motor 2129. Between the first shaft 33 and the gear casing part 11 is disposed an oil seal 49 for prevention of oil leakage to the outside.

The second shaft 35 is supported at its central part and right end by the gear casing part 11 via left and right ball bearings 51 and 53 respectively interposed therebetween.

In this embodiment, the left ball bearing 51 is not located on a left end of the second shaft 35, but on the central part, thereby allowing for the left end to be configured as an engagement part relative to the outer shaft 37.

The inner shaft 39 of the third shaft is supported at its left and right ends by the gear casing part 11 via left and right bearings 55 and 57 respectively interposed therebetween. The outer shaft 37 is supported at its left end and central part by an outer periphery of the inner shaft 39 via left and right bearings 59 and 61 respectively interposed therebetween.

The differential case 41 is supported at its left and right ends by the differential carrier part 13 via left and right bearings 63 and 65 respectively interposed therebetween.

Like above-mentioned, the reduction gear set 19 includes (as the reduction gar 31) the ring gear on the rear differential 7 side, and further the reduction gear sets 15, 17, and 19 are accommodated in the same casing 9. The reduction gear sets 15, 17, and 19 are thus integrated with the rear differential 7, to be a unit.

The on-off clutch S is disposed between the outer shaft 37 and the inner shaft 39. When the clutch 5 is engaged for interconnection, drive power of the electric motor 2129 is transmitted, via the reduction gear sets 15, 17, ad 19, where its speed is reduced in a three-staged manner, to the differential case 41 of the rear differential 7 to be thereby rotated.

The rear differential 7 has a bevel gear type differential mechanism, which is constituted with a plurality of pinion shafts fixed to the differential casing 41, a plurality of pinion gears individually supported by the pinion shafts, and a pair of torque outputting left and right side gears meshing with the pinion gears.

The left and right side gears are splined on the left and right rear axles 67 and 69, which transversely extend through the differential carrier part 13, to be externally connected via left and right joints 71 and 73 to the left and right rear wheels 2125 and 2127.

Between each rear axle 67 or 69 and the differential carrier part 13 is disposed an oil seal 75 for prevention of oil leakage to the outside.

As the electric motor 2129 rotates, drive power therefrom is input to the differential case 41, wherefrom it is distributed via the pinion shafts and the pinion gears to the left and right side gears, and further via the left and right rear axles 67 and 69 to the left and right rear wheels 2125 and 2127, rendering the vehicle four-wheel driven, with enhanced abilities such as for bad-road escape and travel, start, acceleration, and vehicle body stabilization.

If a difference develop between rear wheel drive resistances such as on a bad road, the pinion gears individually revolve to effect a differential distribution of drive power to the left and right rear wheels 2125 and 2127.

When rotation of the electric motor 2129 is stopped, the vehicle enters a two-wheel driven state with the front wheels 2113 and 2115 driven from the engine 2101, where the controller 2133 cancels engagement of the on-off clutch 5, thereby interrupting the interconnection between the electric motor 2129 and the rear wheels 2125 and 2127.

The on-off clutch 5 is constituted with a rotary case 77, a main clutch 79 as a multi-plate frictional clutch, a multi-plate pilot clutch 81, a ball cam 83, a cam ring 85, a pressure plate 87, an armature 89, an electric magnet 91, and a trochoid gear pump 93, and controlled from the controller 2133.

The rotary case 77 is welded to the outer shaft 37 of the reduction gear set 19, and the main clutch 79 is arranged between the rotary case 77 and the inner shaft 39 of the reduction gear set 19.

The pilot clutch 81 is arranged between the rotary case 77 and the cam ring 85.

The ball cam 83 is formed between the cam ring 85 and the pressure plate 87. The rotary case 77 has a left wall part as a rotor 95 of a magnetic material constituting part of a magnetic flux circuit of the magnet 91. The rotor 95 is supported by needle bearings 97 arranged on the inner shaft 39.

Between the cam ring 85 and the rotor 95 is disposed a thrust bearing 99 receiving a cam reaction force of the ball cam 83, as well as a washer.

The pressure plate 87 is relatively movably connected to the inner shaft 39.

The armature 89 is axially movably disposed between the pilot clutch 81 and the pressure plate 87, and is axially positioned by a stop ring.

The magnet 91 has a core 101 connected to the gear casing part 11 by a connection member 103 and a bolt 105, and lead wires 109 drawn out from a coil 107 via the core 101 and the gear casing part 11, to be externally connected to the battery 2131 of the vehicle.

Between the core 101 and the rotor 95 is provided an air gap. The rotor 95 is radially divided with stainless steel rings to thereby constitute part of the magnetic flux circuit of the magnet 91.

The controller 2133 is adapted for excitation of the magnet 91, control of exciting current, cease of excitation, etc.

The controller 2133 is further adapted to control the rear-wheel driving electric motor 2129 to start and stop rotation. When rotation of the electric motor 2129 is stopped, excitation of the magnet 91 also is stopped.

When the magnet 91 is excited, the armature 89 is attracted, pressing the pilot clutch 81 to engage.

As the pilot clutch 81 is engaged, torque to be transmitted between the reduction gear sets 17 and 19 is imposed on the ball cam 83, via the cam ring 85 connected by the pilot clutch 81 to the rotary case 77 and the pressure plate 87 connected to the inner shaft 39. There is generated a cam thrust force, which is received by the pressure plate 87, which is thus forced to move rightward, pressing the main clutch 79 to engage.

When the on-off clutch 5 is thus connected, drive power of the electric motor 2129 is transmitted through the reduction gear sets 15, 17, and 19, to the rear differential 7, rendering the vehicle four-wheel driven.

As the exciting current of the magnet 91 is controlled, the pilot clutch 81 has a commensurate slip, changing the cam thrust force of the ball cam 83, causing the main clutch 79 to have a varied connection force, thereby controlling drive power to be transmitted from the electric motor 2129 to the rear wheel ends.

Such control of drive power can be effected while the vehicle is turning, with enhanced turnability and increased stability of the vehicle body.

When the excitation of the magnet 91 is stopped, the pilot clutch 81 is released, causing the ball cam 83 to lose cam thrust force, and the main clutch 79 is released, canceling connection of the on-off clutch 5, thereby rendering the vehicle two-wheel driven.

The controller 2133 is adapted, when the vehicle starts, to rotate the electric motor 2129 and concurrently make the on-off clutch 5 connected, causing the vehicle to enter a four-wheel driven state, where it has increased drive power due to cooperation of the engine 2101 and the electric motor 2129, with enhanced starting and accelerating abilities.

When a specified vehicle speed (for example, 20 km/h) is reached, the controller 2133 stops rotation of the electric motor 2129, concurrently canceling connection of the on-off clutch 5, causing the vehicle to enter a two-wheel driven state.

Further, the controller 2133 is adapted, also when going up a slope, to render the vehicle four-wheel driven to have increased drive power.

While going up the slope, if the vehicle suffers a roll back condition in which the front wheels 2113 and 2115 idle so that the vehicle retreats, the controller 2133 stops rotation of the electric motor 2129 and cancels connection of the on-off clutch 5.

Like this, when connection of the on-off clutch 5 is canceled, the electric motor 2129 is cut off from the rear wheels 2125 and 2127, to be free from forced rotation due to rotation of the rear wheels (in a forward direction when going ahead, or in a reverse direction when rolling back).

When increased drive torque is desirable, while travelling, irrespective of the specified vehicle speed after the start of vehicle, the controller 2133 may be controlled to rotate the electric motor 2129 and connect the on-off clutch 5, to have an increased ability to run over a difference in level or cavity or depression in a road, with still enhanced accelerating ability.

The trochoid gear pump 93 is driven for rotation by the inner shaft 39 via a hollow connection shaft 111, to pump up oil from the oil sump of the casing 9, and to supply pumped oil through axial and radial oil paths formed in the connection shaft 111 and the inner shaft 39 to the main clutch 79, pilot clutch 81, ball cam 83, thrust bearing 99, and the like, making sufficient lubrication and cooling thererto.

The coil 107 of the magnet 91 also is cooled by oil, having a stabilized performance, while the heat warms oil in the oil sump, as well as the pilot clutch 81 and the ball cam 83 thereround, and warmed oil is sent from the gear box 93 to the main clutch 79 and the like, warming them.

The power transmission system 1 of the electric motor 2129 is thus constructed.

In the power transmission system 1, when the vehicle is two-wheel driven or suffering a rollback, the electric motor 2129 is disconnected from the rear wheels by the on-off clutch 5, preventing generation of emf that otherwise might have imposed great loads such as on the battery, alternator, associated circuit elements, etc.

These elements thus have their functions maintained to be adequate, with improved durability.

The electric motor 2129 is not forced to rotate by rotation of the rear wheels, whereby the burden on, as well as the temperature rise of, magnetic field or rotator side windings and burdens on the bearings are reduced, with improved durability of the electric motor 2129.

As brushes of the electric motor 2129 have a greatly increased durability, their replacement can do with a commensurate decrease in frequency, resulting in a great decrease of maintenance cost.

The on-off clutch 5 is disposed between the reduction gear sets 17 and 19, whereby the on-off clutch 5 is integrated with the speed-reducing mechanism, resulting in a commensurate light-weighting, compact size, and vehicle-mountability of the power transmission system 1.

Components of the on-off clutch 5, such as the main clutch 79, pilot clutch 81, and ball cam 83 are sufficiently lubricated and cooled by forced lubrication by the gear pump 93, to have a greatly improved durability, allowing for a use near 100-% capacity.

The on-off clutch 5 is thus allowed to be smaller in size, permitting the power transmission system 1 to be the more light-weighted and compact.

The arrangement with the on-off clutch 5 provided in the speed-reducing mechanism allows, for example, a selected on-off clutch 5 to be disposed in an optimal place selective from among the reduction gear sets 15, 17, and 19 in accordance with the type and capacity, or an optimal on-off clutch to be selected in accordance with given conditions such as a sliding speed and transmitting torque of the reduction gear set 15, 17, or 19.

Like this, for the on-off clutch 5, flexibility of design is greatly increased with respect to the clutch location and selection.

The reduction gear sets 15, 17, and 19 and the rear differential 7 are installed as a unit in the casing 9, thereby allowing the power transmission system 1 to be the more light-weighted, compact in size, and improved in vehicle-mountability.

By this unitizing, a volume of oil sealed in the casing 9 can be wholly supplied to the on-off clutch 5, with increase in amount of circulating oil, allowing for the on-off clutch 5 to have greatly enhanced lubrication and cooling effects.

Because the reduction gear sets 15, 17, and 19 are arranged near the differential center of the differential apparatus 7, an entirety of power transmission system including the differential apparatus 7 and the speed-reducing mechanism 3 can be well-balanced.

In particular, a connection portion (or joint parts when separately formed and disposed adjacent to each other) between the differential apparatus 7 and the speed-reducing mechanism 3 is free from undue extra forces, as an advantage in strength, as well.

In addition, the power transmission system 1 using a multi-plate main clutch 79 (as a frictional clutch) is allowed to arbitrarily control drive torque of the electric motor 2129 to be transmitted to the rear wheel end, by regulating pressing forces of the main clutch 79 to adjust connection forces of the on-off clutch 5.

Further, the use of the on-off clutch 5 as a frictional clutch eliminates generation of ratchet sounds such as in meshing clutch for example, and high of calmness.

The use of a frictional on-off clutch 5 eliminates shocks and shock sounds in clutch connection and cancellation thereof.

The frictional on-off clutch 5 does not need synchronization of rotation in clutch connection and cancellation thereof, and no synchronizing mechanism is necessary, so that the power transmission system 1 can be the more light-weighted, compact, and reduced in fabrication cost.

Further, because the main clutch 79, oil and the like are warmed by heat of the magnet 91 (coil 107), when connection of the on-off clutch 5 is cancelled, dragging torque to be produced at the rear wheel end by viscosity of oil, in particular when the oil temperature is low, can be reduced, allowing for the engine to have a commensurate reduction in loss of drive power, resulting in improved fuel consumption.

Because of unnecessary countermeasures such as lowering oil viscosity, raising temperature, and reducing amount of oil for the dragging torque to be reduced, implementation can be the more reduced in cost.

Moreover, the electric motor 2129 is not mechanically rotated by dragging torque, protection performances such as of a battery, alternator, and circuit elements can be improved, as well as durability of the electric motor 2129.

The on-off clutch 5 is allowed to have an increased frictional surface area by use of the multi-plate main clutch 79, in addition to that pressing forces of the main clutch 79 can be magnified by the ball cam 83. The clutch 5 can thus provide a sufficient capacity even when small-sized.

Therefore, the power transmission system 1 is allowed to handle great drive power, while the on-off clutch 5 to be compact in size can be more light-weighted and compact, with improved vehicle-mountability.

Still more, because the on-off clutch 5 is variable in diamter and number of clutch plates of the main clutch 79, its capacity can be aribtrarily controlled, with an enhanced design flexibility.

In this embodiment in which the on-off clutch 5 is arranged to the third shaft that is nearest to the differential apparatus 7 among shafts of the speed-reducing mechanism 3, the on-off clutch 5 can be disposed within a projection region of a large component, such as the ring gear 31 of the differential apparatus 7, permitting the system 1 to be entirely small-sized.

There will be described below various power transmission systems according to other embodiments of the invention. It is noted that each power transmission system to be described is arranged on a rear wheel side of a four-wheel driven vehicle using both an engine as a main drive power source and an electric motor 2129 as an auxiliary drive power source, like the power transmission system 1 according to the first embodiment, whereas front wheels of the vehicle are normally driven from the engine and rear wheels thereof are driven from the electric motor 2129, when necessary.

Second Embodiment

Figure 3:
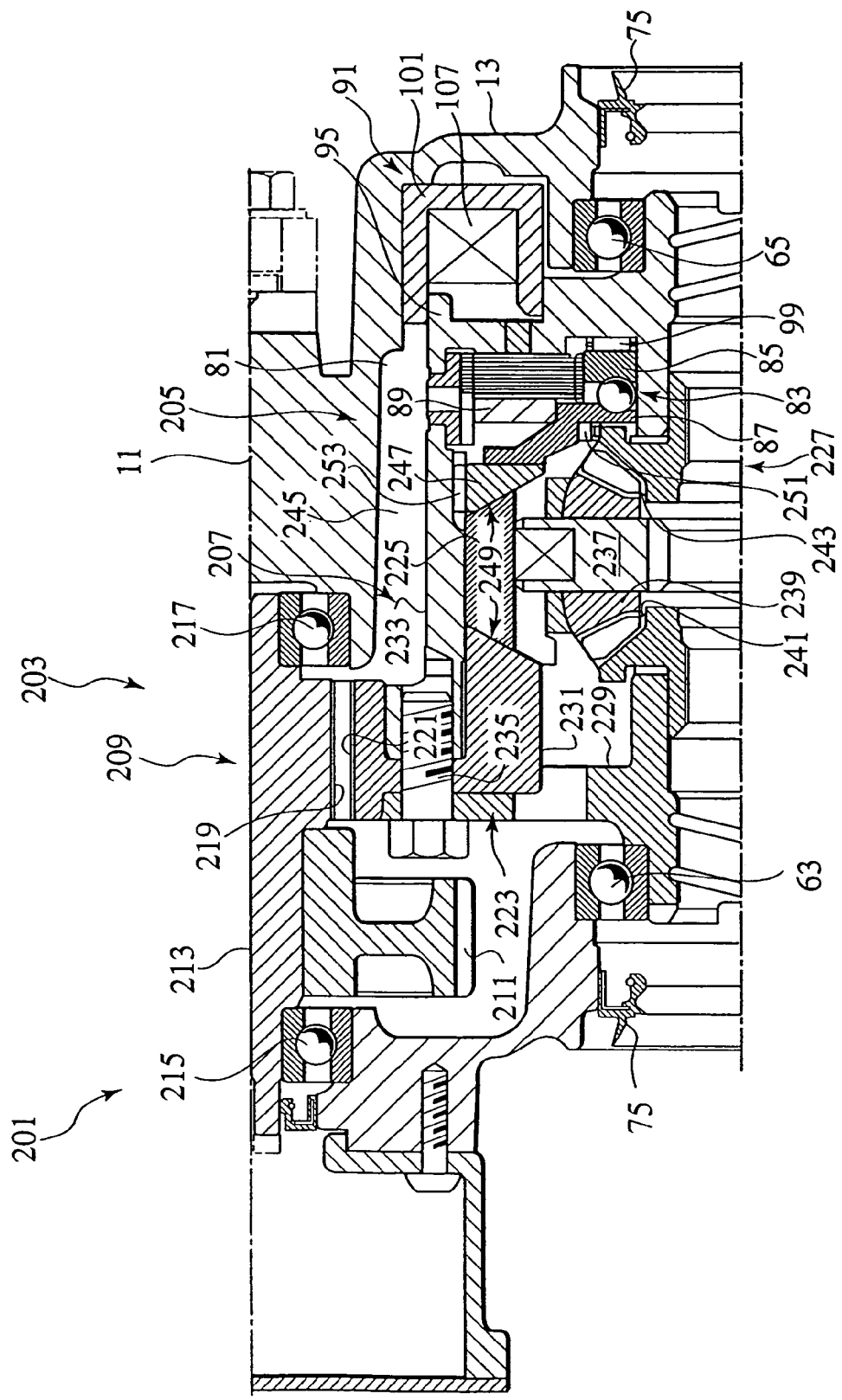
FIG. 3 is a sectional view of an essential portion of a power train system including a power transmission system according to a second embodiment of the invention.

With reference to FIG. 3, description is made of a transmission system 201 of drive power of an electric motor 2129 according to the second embodiment of the invention and a method of operation thereof.

The power transmission system 201 has features of the $1^{st}$, $2^{nd}$, $8^{th}$, $9^{th}$, $10^{th}$, and $12^{th}$ aspects of the invention. Note the terms "left" and "right" mean those of a vehicle equipped with the power transmission system 201, and those in FIG. 3.

Like reference numerals are given to members having like functions as those of the power transmission system 1 according to the $1^{st}$ embodiment of the invention. Those members with like functions are not described to avoid redundancy.

The power transmission system 201 is constituted with a speed-reducing mechanism 203, an on-off clutch 205 (as a clutch) to be electromagnetically controlled, a rear differential 207 (as a differential apparatus), a controller 2133, etc.

The power transmission system 201 is accommodated in a casing 9, which is constituted as a combination of a gear casing part 11 for accommodating the speed-reducing mechanism 203 and a differential carrier part 13 for accommodating the rear differential 207 in which the on-off clutch 205 is incorporated.

The speed-reducing mechanism 203 is constituted with reduction gears equivalent to the reduction gear sets 15, 17, and 19 of the power transmission system 1, and transmits drive torque of the electric motor 2129 to the rear differential 207 in a speed-reducing manner.

A reduction gear 27 of the reduction gear set 17 is welded to a third axis 213, which is supported by ball bearings 215 and 217 fixed to the gear casing part 11.

A reduction gear 29 of the reduction gear set 19 is formed on the third shaft 213.

The rear differential 207 is provided with a differential case 223, a rotary case 225, and a differential mechanism 227 of a bevel gear type.

The differential case 41 is constituted with a cover 229, an input member 231, and an outer case 233 fastened by bolts 235 for fixation, and a reduction gear 31 of the reduction gear set 19 is formed on the input member 231.

The rotary case 225 is arranged so as to rotate relative to an inner periphery of the differential case 223.

The differential mechanism 227 is constituted with a plurality of pinion shafts 237, pinion gears 239 individually supported by the pinion shafts 237, and output end side gears 241 and 243 meshing with the pinion gears 239.

The side gears 241 and 243 are splined on left and right rear axles 67 and 69, respectively.

The on-off clutch 205 is configured for interconnection and disconnection between the differential case 223 and the rotary case 225, as will be described.

When the on-off clutch 205 is engaged for interconnection, if the electric motor 2129 is rotated, the differential case 223 is driven to rotate, and this drive power is transmitted via the rotary case 225 and the on-off clutch 205 to the pinion shafts 237, and is distributed therefrom via the pinion gears 239, the side gears 241 and 243, and the rear axles 67 and 69 to left and right rear wheels, rendering the vehicle four-wheel driven, with enhanced abilities such as for bad-road escape and travel, start, acceleration, and vehicle body stabilization.

If a difference develop between rear wheel drive resistances such as on a bad road, the pinion gears 239 individually revolve to effect a differential distribution of the drive power from the electric motor 2129 to the left and right rear wheels.

When rotation of the electric motor 2129 is stopped, the vehicle enters a two-wheel driven state with front wheels driven from the engine, where the controller 2133 cancels engagement of the on-off clutch 205, thereby interrupting the interconnection between the electric motor 2129 and the rear wheels.

The on-off clutch 205 is constituted with a cone clutch 245 (as a frictional clutch), a multi-plate pilot clutch 81, a ball cam 83, a cam ring 85, a pressure plate 87, a clutch ring 247, an armature 89, an electric magnet 91, a controller 2133, etc.

The cone clutch 245 is constituted with an input member 231 on the differential case 223 side, and cone parts 249, 249 formed between the clutch ring 247 and the rotary case 225 on the differential mechanism 227 side. The input member 231, the clutch ring 247, and the rotary case 225 are made of a sintered metallic material, with a sufficient resistance to abrasion.

The pilot clutch 81 is arranged between the cam ring 85 and a rotor 95 on the outer case 233 (differential case 233) side.

The pressure plate 87 is movably connected to the right side gear 243 by a spline part 251 provided therebetween, and the clutch ring 247 is movably connected to the outer case 233 by a spline part 253.

The pressure plate 87 may not be connected to the side gear 243, but movably to the rotary case 225 side.

The controller 2133 is adapted, like the first embodiment, for excitation of the magnet 91, control of exciting current, cease of excitation, etc., as well as for concurrent services to operate the electric motor 2129 and the magnet 91 and stop the operations.

When the electric motor 2129 is rotated and the magnet 91 is excited, the armature 89 presses the pilot clutch 81 to engage, so that differential torque of the differential mechanism 227 (drive power from the electric motor 2129) is applied to the ball cam, via the cam ring 85 connected by the pilot clutch 81 to the differential case 223 and the pressure plate 87 on he side gear 243 side. There is generated a cam thrust force, which is received by the pressure plate 87, which is thus forced to move leftward, pressing the cone parts 249 via the clutch ring 247, causing the cone clutch 245 to be engaged.

When the cone clutch 245 is thus engaged, drive power of the electric motor 2129 is transmitted through respective reduction gear sets to the rear differential 207, rendering the vehicle four-wheel driven.

As the exciting current of the magnet 91 is controlled, the pilot clutch 81 has a commensurate slip, changing the cam thrust force of the ball cam 83, causing the cone clutch 245 to have a varied connection force, thereby controlling drive power to be transmitted from the electric motor 2129 to the rear wheel end.

Such control of drive power can be effected while the vehicle is turning, with enhanced turnability and increased stability of the vehicle body.

When the excitation of the magnet 91 is stopped, the pilot clutch 81 is released, causing the ball cam 83 to lose cam thrust force, and connection of the cone clutch 245 is canceled, rendering the vehicle two-wheel driven.

Like the first embodiment, the controller 2133 is adapted, when the vehicle starts, to rotate the electric motor 2129 and concurrently operate the on-off clutch 205, so that the vehicle has increased drive power, and respond to a critical vehicle speed by stopping rotation of the electric motor 2129, thereby canceling connection of the on-off clutch 205.

Further, when four-wheel driven to go up a slope, if the vehicle suffers a rollback with front wheels idling, the controller 2133 is stops rotation of the electric motor 2129, canceling connection of the on-off clutch 205.

Like this, when connection of the on-off clutch 205 is canceled, the electric motor 2129 is cut off from the rear wheels, to be free from forced rotation due to rotation of the rear wheels.

When increased drive torque is desirable to have an increased ability to run over a difference in level or cavity in a road, with still enhanced accelerating ability, the controller 2133 may be controlled to rotate the electric motor 2129 and connect the on-off clutch 205, thereby rendering the vehicle four-wheel driven.

The differential case 223 is formed with openings 255 and 257, and spiral oil grooves 263 and 265 in inner peripheries of boss parts 259 and 261.

As the differential case 223 rotates, oil flows between the differential case 223 and an oil sump of the casing 9 via the openings 255 and 257 and oil grooves 263 and 265. Oil flowing into the differential case 223 is sufficient for lubrication and cooling such as of meshing gear parts of the differential mechanism 227, cone clutch 245, pilot clutch 81, ball cam 83, and bearings 99.

Heat of the coil 107 of the magnet 91 is used to warm oil in the oil sump, as well as the pilot clutch 81 and the ball cam 83 therearound, and warmed oil warms the cone clutch 245.

The power transmission system 201 of the electric motor 2129 is thus constructed.

In the power transmission system 201, such as when the vehicle is two-wheel driven or suffering a rollback, the electric motor 2129 is disconnected from the rear wheels by the on-off clutch 205, as necessary, and is released not to be forced to rotate by rotation of the rear wheels.

In this power transmission system 201, the on-off clutch 205 is integrated with the rear differential 207 and a frictional clutch (the cone clutch 245) is employed for the on-off clutch 205, whereby there are achieved like effects to the power transmission system 1 of the first embodiment in which the on-off clutch 5 is integrated with a speed-reducing mechanism and a frictional clutch (the multi-plate main clutch 79) is employed for the on-off clutch 5.

The power transmission system 201 has like effects to the first embodiment, except those derived from disposing the on-off clutch 5 between gears of the speed-reducing mechanism, using a multi-plate clutch for the on-off clutch 5, and using the gear pump 93 for lubrication.

In addition, as the cone clutch 245 is simple in structure and small in number of components, the power transmission system 201 can be the more light-weighted, compact, and enhanced in vehicle-mountability, with low costs.

Third Embodiment

Figure 4:
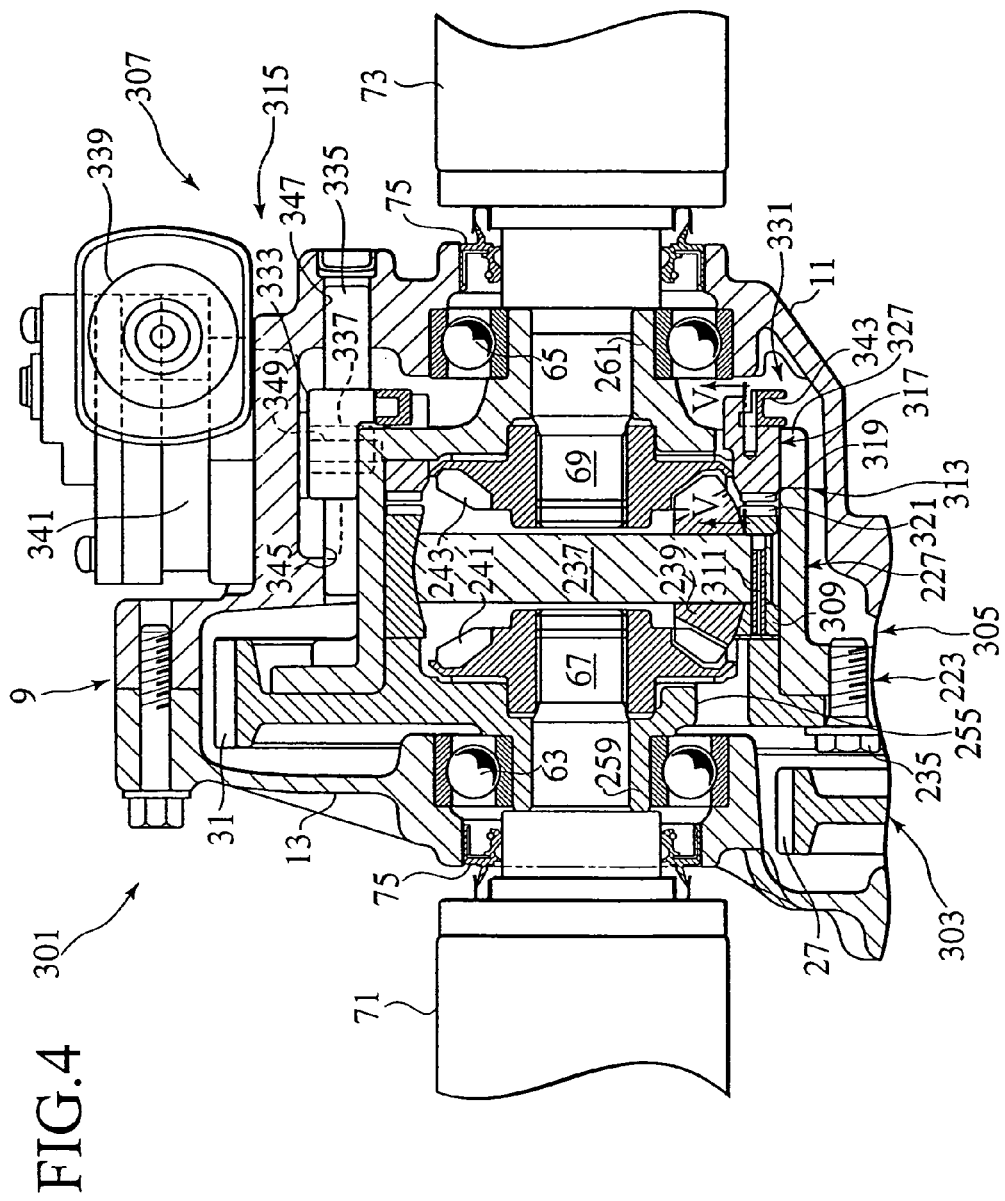
FIG. 4 is a sectional view of an essential portion of a power train system including a power transmission system according to a third embodiment of the invention.
Figure 5:
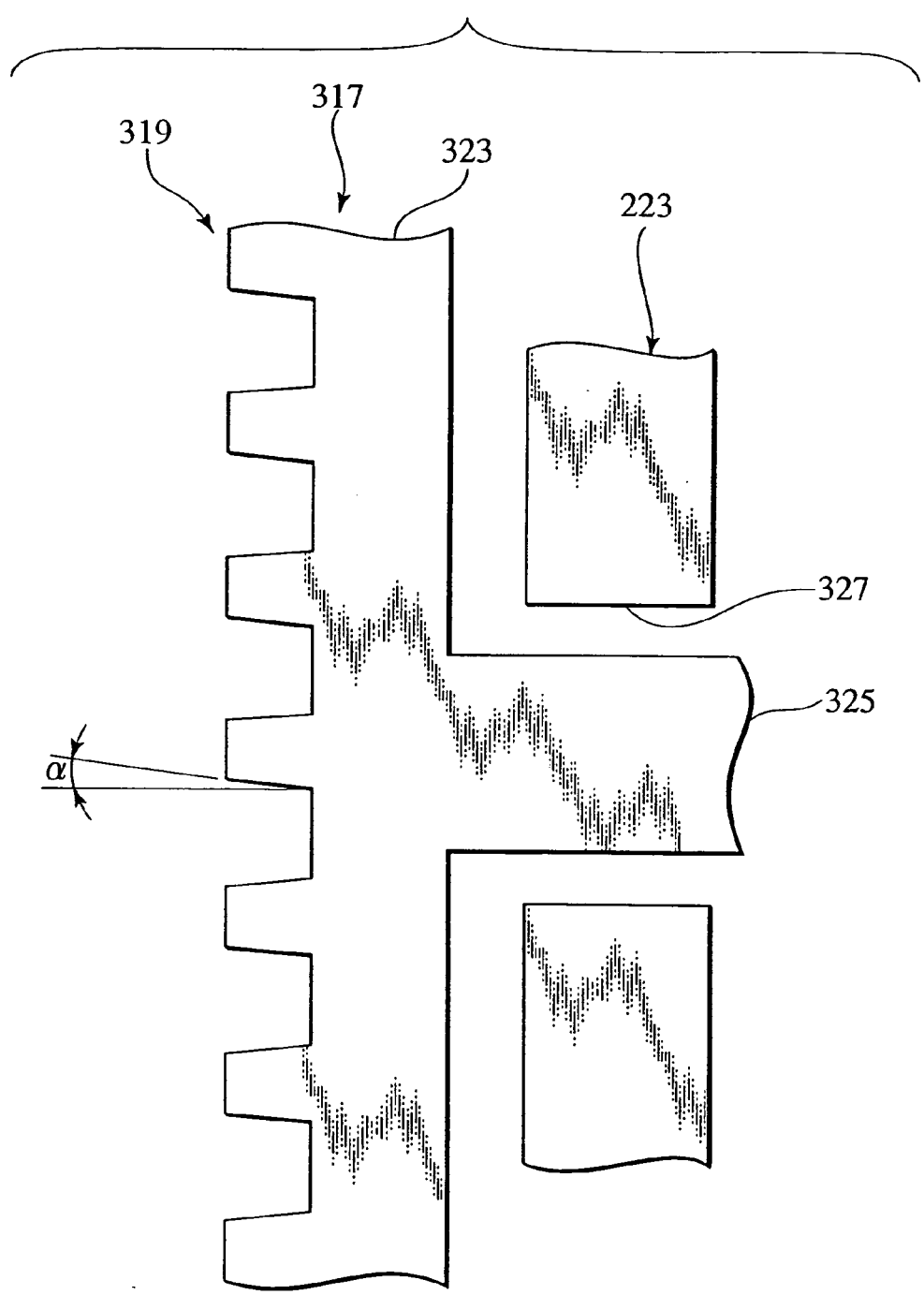
FIG. 5 is a section along line V—V of FIG. 4.

With reference to FIGS. 4 and 5, description is made of a transmission system 301 of drive power of an electric motor 2129 according to the third embodiment of the invention and a method of operation thereof.

The power transmission system 301 has features of the $1^{st}$, $2^{nd}$, $8^{th}$, $9^{th}$, $13^{th}$, and $14^{th}$ aspects of the invention and the operating method has features of the $18^{th}$ and $19^{th}$ aspects of the invention. Note the terms "left" and "right" mean those of a vehicle equipped with the power transmission system 301, and those in FIGS. 4 and 5. Like reference numerals are given to members having like functions as those of the power transmission systems 1 and 201 according to the $1^{st}$ and $2^{nd}$ embodiments of the invention. Those members with like functions are not described to avoid redundancy.

The power transmission system 301 is constituted with a speed-reducing mechanism 303, a rear differential 305 (as a differential apparatus), an on-off clutch 307 (as a clutch), a controller 2133, etc.

The speed-reducing mechanism 303 is analogous in structure to the speed-reducing mechanism 3 or 203.

The rear differential 305 is provided with a differential case 223, a rotary case 309, and a differential mechanism 227 of a bevel gear type.

Pinion shafts of the differential mechanism 227 are engaged with the rotary case 309, and fixed by spring pins 311.

The on-off clutch 307 is constituted with a dog clutch 313 (as a meshing clutch), an operation mechanism 315 therefor, the controller 2133, etc.

The dog clutch 313 is constituted with meshing teeth 319 and 321 formed on a clutch ring 317 and the rotary case 309, respectively.

As shown in FIG. 4, the clutch ring 317 is constituted with a base part 323 formed with the meshing teeth 319, and a plurality of arm parts 325 formed on the base part 323. The arm parts 325 project outward, engaging with an opening 327 of the differential case 223, for axially movably connecting the differential case 223 to the clutch ring 317.

When the clutch ring 317 moves rightward, the meshing teeth 319 and 321 (as the dog clutch 313) mesh each other, and when the clutch ring 317 returns leftward, the meshing of the dog clutch 313 is canceled.

In a meshing state of the dog clutch 313, rotation of the differential case 223 is transmitted from the rotary case 390 to the differential mechanism 227. When the meshing of the dog clutch 313 is canceled, the rotary case 309 and subsequent components on the rear wheel side are disconnected.

Further, as in FIG. 4, the meshing teeth 319 of the clutch ring 317 has a cam angle a, and the meshing teeth 321 of the rotary case 309 have the same cam angle.

In a meshing engagement of the dog clutch 313 with transmission torque applied on the meshing teeth 319 and 321, the above-noted cam angle produces a cam thrust force 329 in a direction for the clutch ring 317 to be moved toward a meshing canceling side.

The operation mechanism 315 is constituted with an operation ring 331, a shift fork 333, a shift rod 335, a swing shaft 337, a motor 339 controllable for switching the direction of rotation, a direction change gear mechanism 341, etc.

The operation ring 331 is fixed to the clutch ring 317, and the shift fork 333 is slidably engaged with a circumferential groove 343 of the operation ring 331. The shift fork 333 is fixed onto the shift rod 335, and the shift rod 335 is movably engaged with support holes 345 and 347 of the differential carrier part 13, for guiding the shift fork 333 to axially move.

The swing shaft 337 is formed with a convex part 349, which is engaged with a concave part of the shift fork 333.

Drive power of the motor 339 is changed in direction by the direction change gear mechanism 341, to swing the swing shaft 337. When the swing shaft 337 is swung, the shift fork 333 is moved, acting via the clutch ring 317 on the operation ring 331 to move, and when the direction of rotation of the motor 339 is changed, the swing shaft 337 is swung in a changed direction, whereby the clutch ring 317 is reciprocally operated.

The dog clutch 313 is thus operated for connection and disconnection.

The controller 2133 is adapted, like the first or second embodiment, to assist drive power of the engine by drive power of he electric motor 2129 when the vehicle starts, and at a critical vehicle speed, to stop rotation of the electric motor 2129, while controlling the motor 339 to cancel meshing engagement of the dog clutch 313.

Further, when four-wheel driven to go up a slope, if the vehicle suffers a rollback, the controller 2133 stops rotation of the electric motor 2129, canceling meshing of the dog clutch 313.

Like this, when meshing of the dog clutch 313 is canceled, the electric motor 2129 is cut off from the rear wheels, to be free from forced rotation due to rotation of the rear wheels.

When increased drive torque is desirable in travel to have an increased ability to run over a difference in level or cavity in a road, with still enhanced accelerating ability, the controller 2133 may be controlled to rotate the electric motor 2129 and bring the dog clutch 313 into meshing, thereby rendering the vehicle four-wheel driven.

Like this, the cancellation of meshing of the dog clutch 313 is promoted when the clutch ring 317 is pressed in the meshing canceling direction with the cam thrust force 329 developed at the meshing teeth 319 and 321.

When canceling meshing of the dog clutch 313, the controller 2133 follows an operation method according to the invention, in which revolution number of the driving electric motor 2129 is changed to thereby give the meshing teeth 319 and 321 adequate vibrations to reduce frictional resistance, or rotational direction of the driving electric motor 2129 is switched to thereby give the meshing teeth 319 and 321 adequate vibrations to reduce frictional resistance.

By the cam thrust force 329 and vibrations to the meshing teeth 319 and 321, the cancellation of meshing of the dog clutch 313 can be performed in a fast response.

Further, oil flows from an oil sump of the casing 9 via the openings 255 and 257 and oil grooves of boss parts 259 and 261 into the differential case 223, giving sufficient lubrication and cooling to gear meshing parts of the differential mechanism 227, the dog clutch 313, etc.

Heat of the coil 107 of the magnet 91 is used to warm oil in the oil sump, as well as the pilot clutch 81 and the ball cam 83 therearound, and warmed oil warms the cone clutch 245.

The power transmission system 301 of the electric motor 2129 is thus constructed.

In the power transmission system 301, such as when the vehicle is two-wheel driven or suffering a rollback, the electric motor 2129 is disconnected from the rear wheels by the on-off clutch 307, and is released not to be forced to rotate by rotation of the rear wheels.

In this power transmission system 301, the dog clutch 313 is integrated with the rear differential 305 and a frictional clutch (the dog clutch 313) is employed for the on-off clutch 307, whereby there are achieved like effects to the power transmission system 1 of the first embodiment in which the on-off clutch 5 is integrated with a speed-reducing mechanism and a frictional clutch (the multi-plate main clutch 79) is employed for the on-off clutch 5.

The power transmission system 301 has like effects to the first embodiment, except those derived from disposing the on-off clutch 5 between gears of the speed-reducing mechanism, using a multi-plate clutch for the on-off clutch 5, and using the gear pump 93 for lubrication.

In addition, as the dog clutch 313 is small in size and large in capacity, the power transmission system 301 is allowed to handle great drive power and to be the more light-weighted, compact, and enhanced in vehicle-mountability.

The dog clutch 313 is simple in structure and small in component number, so that the power transmission system 301 can be fabricated with the lower cost.

In addition, because the dog clutch 313 (as a meshing clutch) is free from dragging torque due such as to viscosity of oil, unlike the frictional clutches, the loss of drive power is little, allowing enhanced fuel consumption.

Because of unnecessary countermeasures such as lowering oil viscosity, raising temperature, and reducing amount of oil for the dragging torque to be reduced, implementation can be the more reduced in cost.

Moreover, because the electric motor 2129 is not mechanically rotated by dragging torque, protection performances such as of a battery, alternator, and circuit elements can be improved, as well as durability of the electric motor 2129.

Further, when canceling connection of the on-off clutch 307, the cancellation of meshing of the dog clutch 313 is promoted by the motor, so that connection of the on-off clutch 307 can be canceled at an intended instance or a critical vehicle speed, and the vehicle can be changed over from a four-wheel driven state to a two-wheel driven state in a necessary timing.

Therefore, the power transmission system 301 is allowed to have high protection performances such as of the electric motor 2129, battery, alternator, circiut elements, etc.

Fourth Embodiment

Figure 6:
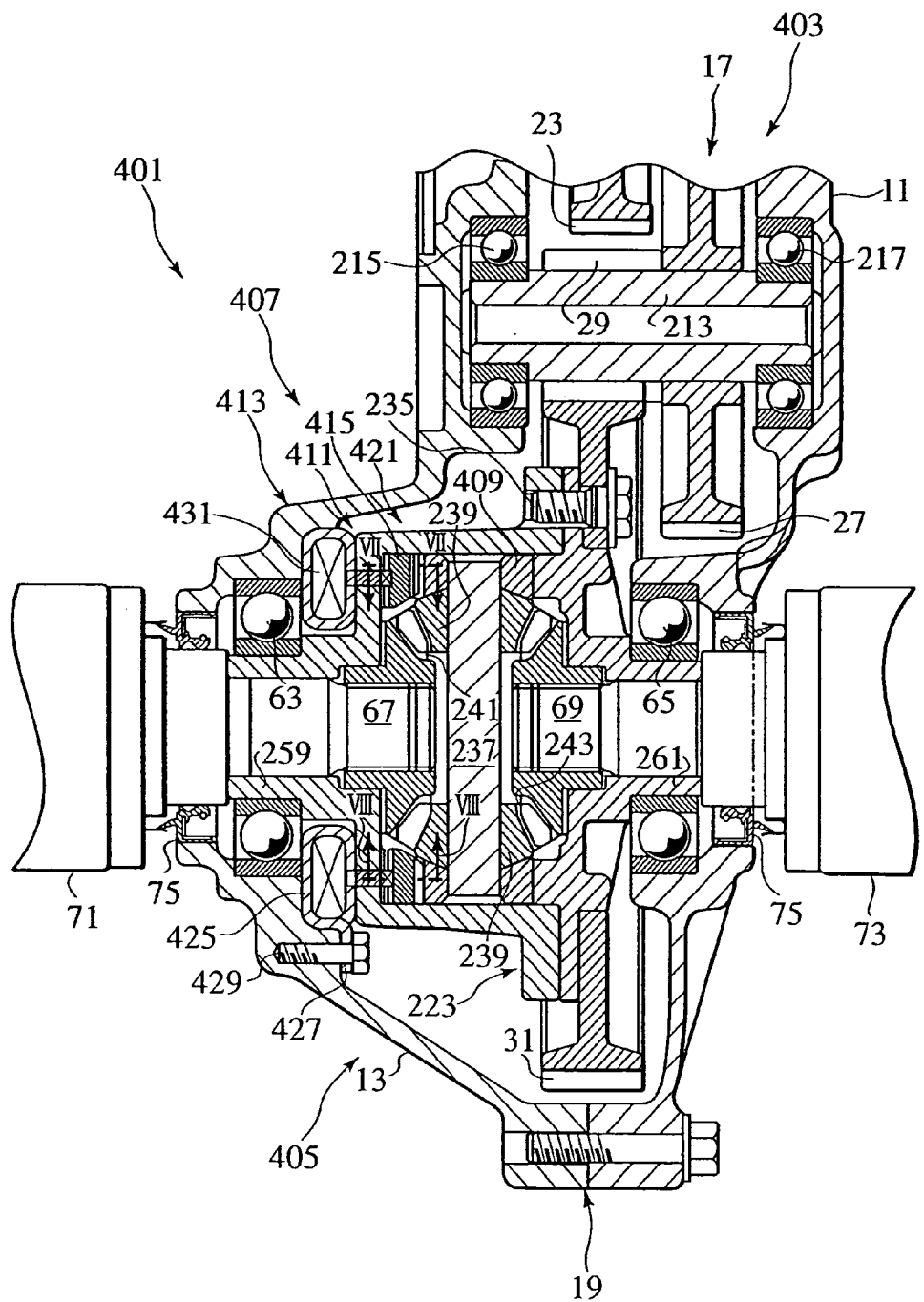
FIG. 6 is a sectional view of an essential portion of a power train system including a power transmission system according to a fourth embodiment of the invention.
Figure 7:
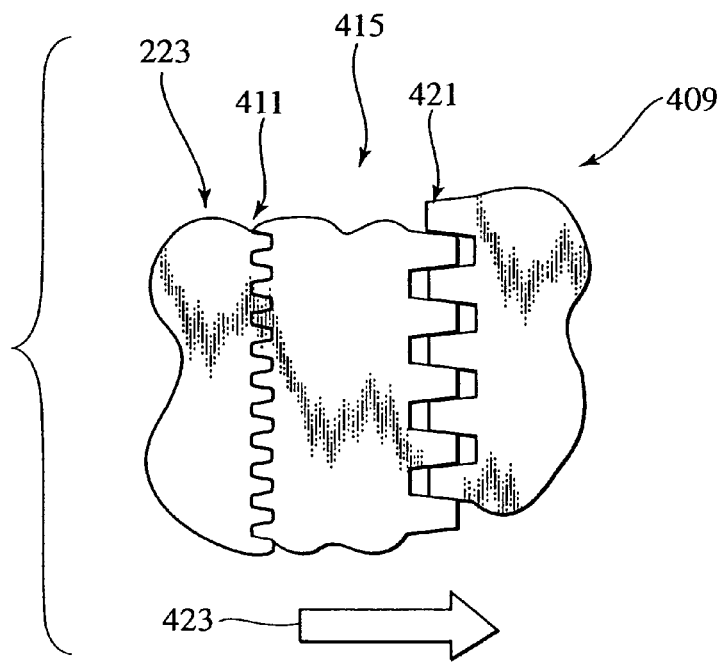
FIG. 7 is a section along line VII—VII of FIG. 6.
Figure 8:
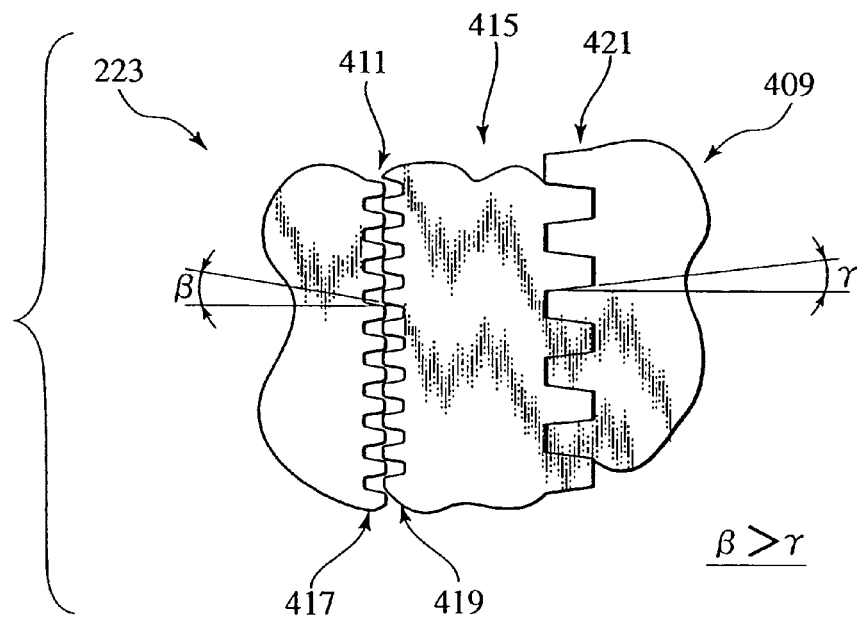
FIG. 8 is a section along line VIII—VIII of FIG. 6.

With reference to FIGS. 6 to 8, description is made of a transmission system 401 of drive power of an electric motor 2129 according to the fourth embodiment of the invention and a method of operation thereof.

The power transmission system 401 has features of the $1^{st}$, $2^{nd}$, $8^{th}$, $9^{th}$, $13^{th}$, and $14^{th}$ aspects of the invention, and the operating method has features of the $18^{th}$ and $19^{th}$ aspects of the invention. Note the terms "left" and "right" mean those of a vehicle equipped with the power transmission system 401, and those in FIGS. 6 to 8. Like reference numerals are given to members having like functions as those of the power transmission systems 1, 201 and 301 according to the $1^{st}$, $2^{nd}$ and $3^{rd}$ embodiments of the invention, respectively. Those members with like functions are not described to avoid redundancy.

The power transmission system 401 is constituted with a speed-reducing mechanism 403, a rear differential 405 (as a differential apparatus), an on-off clutch 407 (as a clutch), a controller 2133, etc.

The speed-reducing mechanism 403 is analogous in structure to the speed-reducing mechanism 3, 203, or 303.

The rear differential 405 is provided with a differential case 223, a rotary case 409, and a differential mechanism 227 of a bevel gear type.

Pinion shafts 237 of the differential mechanism 227 are engaged with the rotary case 309, to be fixed.

The on-off clutch 407 is constituted with a dog clutch 411 (as a meshing clutch), an electric magnet 413, the controller 2133, etc.

As shown in FIG. 7 and FIG. 8, the dog clutch 411 is constituted with meshing teeth 417 and 419 formed on the differential case 223 and an armature 415, respectively.

The armature 415 is axially movably connected to the rotary case 409 by a meshing part 421 formed therebetween.

As shown in FIG. 7, when the armature 415 moves leftward, the meshing teeth 417 and 419 (as the dog clutch 411) mesh each other, and as shown in FIG. 8, when the armature 415 returns rightward, the meshing of the dog clutch 411 is canceled.

In a meshing state of the dog clutch 411, rotation of the differential case 223 is transmitted from the rotary case 409 to the differential mechanism 227. When the meshing of the dog clutch 411 is canceled, the rotary case 409 and subsequent components on the rear wheel side are disconnected.

Further, as in FIG. 8, the meshing teeth 417 and 419 of the dog clutch 411 have a cam angle β, and the meshing part 421 has a smaller cam angle γ.

When transmission torque is applied on the meshing part 421, the smaller cam angle γ produces a cam thrust force in a direction for the armature 415 to be moved toward a meshing side of the dog clutch 411. In a meshing engagement with transmission torque applied on the meshing teeth 417 and 419, the cam angle β produces a cam thrust force in a direction for the armature 415 to be moved toward a meshing canceling side of the dog clutch 411. As a result, the armature 415 is pressed in the meshing canceling side (FIG. 8) by a differential cam thrust force 423 (FIG. 7).

The magnet 413 has a core 425 connected to an inside of the differential carrier part 13 by a connection member 427 and a bolt 429, and lead wires drawn out therefrom through the differential carrier part 13, to be externally connected to a vehicle-mounted battery.

When the magnet 413 is excited, the armature 415 is attracted leftward, causing the dog clutch 411 to mesh. When the excitation of the magnet 413 is stopped, as in FIG. 7, the meshing engagement of the dog clutch 411 is canceled by the cam thrust force 423.

The controller 2133 is adapted, like the first, second, or third embodiment, when increased vehicle drive torque is desirable, to rotate the electric motor 2129, thereby causing the dog clutch 411 to mesh, rendering the vehicle four-wheel driven.

Further, when the vehicle is in a two-wheel driven state or when suffering a rollback, the controller 2133 stops rotation of the electric motor 2129, canceling meshing of the dog clutch 411, so that the electric motor 2129 is disconnected from rear wheels, to be free from forced rotation due to rotation of the rear wheels.

Like this, the cancellation of meshing of the dog clutch 411 is promoted by the cam thrust force 423.

When canceling meshing of the dog clutch 411, the controller 2133 follows an operation method according to the invention, in which revolution number of the driving electric motor 2129 is changed, or rotational direction thereof is switched to thereby give the meshing teeth 417 and 419 adequate vibrations to reduce frictional resistance.

By the cam thrust force 423 and vibrations to the meshing teeth 417 and 419, the cancellation of meshing of the dog clutch 411 can be performed in a fast response.

Further, oil flows from an oil sump of the casing 9 via openings and oil grooves of boss parts 259 and 261 into the differential case 223, giving sufficient lubrication and cooling to gear meshing parts of the differential mechanism 227, the dog clutch 411, etc.

Heat of a coil 431 of the magnet 413 is used to warm oil in the oil sump, and warmed oil flows into the differential case 223, warms the dog clutch 411, as well as the meshing part 421, to promote movement of the armature 415, thereby smoothing meshing cancellation of the dog clutch 411.

The power transmission system 401 of the electric motor 2129 is thus constructed.

In the power transmission system 401, such as when the vehicle is two-wheel driven or suffering a rollback, the electric motor 2129 is disconnected from the rear wheels by the on-off clutch 407 (dog clutch 411), and is released not to be forced to rotate by rotation of the rear wheels.

In this power transmission system 401, the on-off clutch 407 is constituted with the dog clutch 411 (a frictional clutch), the power transmission system 401 is allowed to have like effects to power transmission system 301 according to the third embodiment that also employs a frictional clutch.

Fifth Embodiment

Figure 10:
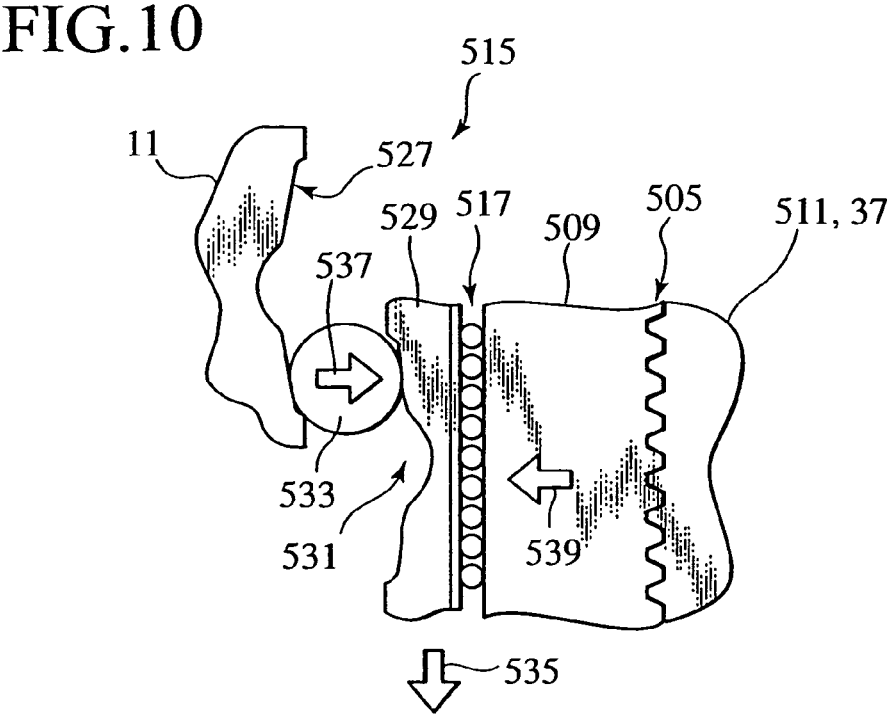
FIG. 10 is a section along line X—X of FIG. 9.

With reference to FIGS. 9 to 11, description is made of a transmission system 501 of drive power of an electric motor 2129 according to the fifth embodiment of the invention and a method of operation thereof.

The power transmission system 501 has features of the $1^{st}$, $2^{nd}$, $6^{th}$, $7^{th}$, $8^{th}$, $9^{th}$, $13^{th}$, and $14^{th}$ aspects of the invention and the operating method has features of the $18^{th}$ and $19^{th}$ aspects of the invention. Note the terms "left" and "right" mean those of a vehicle equipped with the power transmission system 501, and those in FIGS. 9 to 11. Like reference numerals are given to members having like functions as those of the power transmission systems 1, 201, 301 and 401 according to the $1^{st}$, $2^{nd}$, $3^{rd}$ and $4^{th}$ embodiments of the invention. Those members with like functions are not described to avoid redundancy.

The power transmission system 501 is constituted with a speed-reducing mechanism 3, an on-off clutch 503 (as a clutch), a rear differential 7, a controller 2133, etc.

The on-off clutch 503 is interposed between an outer shaft 37 and an inner shaft 39 of the speed-reducing mechanism 3, and controlled by the controller 2133 in synchronism with a rear wheel driving electric motor 2129.

The on-off clutch 503 is constituted with a dog clutch 505 (as a meshing clutch), a sync hub 507, a coupling sleeve 509, a synchronized gear 511, a synchronizer 513, a ball cam 515, needle bearings 517, an operation wire 519, a direction change means 521, etc.

As shown in FIG. 10 and FIG. 11, the dog clutch 505 is constituted with meshing teeth 523 formed on a right part of the coupling sleeve 509, and meshing teeth 525 on the synchronized gear 511.

The sync hub 507 is spline connected on an outer periphery of the inner shaft 39. The coupling sleeve 509 is axially movably connected via a key to an outer peripheral side of he sync hub 507.

The synchronized gear 511 is integrally formed on a left end of the outer shaft 37.

The synchronizer 513 is configured to synchronize rotations between the coupling sleeve 509 (the inner shaft 39) and the synchronized gear 511 (the outer shaft 37), for a match in phase between the meshing teeth 523 and 525.

The ball cam 515 is constituted, as shown in FIG. 10 and FIG. 11, balls 533 arranged between a cam groove 527 formed in a gear casing part 11 and a cam groove 531 formed in the cam ring 529.

The needle bearings 517 are interposed between the cam ring 529 and the coupling sleeve 509, for isolating rotation of he coupling sleeve 509 (outer shaft 37 and inner shaft 39) from the cam ring 529 to prevent erroneous actions of the ball cam 515.

The operation wire 519 is reciprocally operated by an actuator of which actions are controlled by the controller 2133.

The actuator of the operation wire 519, as well as an actuator for operating the coupling sleeve 509 to move, may preferably be am electromagnetic actuator, a fluid actuator such as a pneumatic or hydraulic actuator, or an actuator using an electric motor.

The direction change means 521 is configured for changing a reciprocal movement of the operation wire 519 into a rotational direction or angular movement to thereby rotate the cam ring 529 of the ball cam 515.

As shown in FIG. 10, by the cam ring 529 rotated in an arrow direction 535, the ball cam 515 is operated to produce a cam thrust force 537.

The meshing teeth 523 and 525 of the dog clutch 505 have a cam angle δ. In a meshing engagement of the dog clutch 505 with transmission torque applied to the meshing teeth 523 and 525, the above-noted cam angle produces a cam thrust force 539 in a direction for the coupling sleeve 590 to be moved toward a meshing canceling side.

The cam thrust force 537 of the ball cam 515, which is greater than the above-noted cam thrust force 539, acts via the needle bearings 517 on the coupling sleeve 509 to move rightward. As the coupling sleeve 509 moves rightward, the synchronizer 513 operates for synchronization between the coupling sleeve 509 and the synchronized gear 511 to rotate, and when they are synchronized, the meshing teeth 523 of the coupling sleeve 509 and the meshing teeth 525 of the synchronized gear 523 mesh each other, so that the dog clutch 505 is brought into meshing engagement.

When the operation wire 519 is operated in an opposite direction, the direction change means 521 rotates the cam ring 529 in a reverse direction to arrow 535. Along therewith, the cam thrust force 537 of the ball cam 515 disappers, so that as shown in FIG. 11 the coupling sleeve 509 returns leftward, canceling the meshing engagement of the dog clutch 505.

While the dog clutch 505 is meshing, drive powre of the electric motor 2129 is transmitted through reduction gear sets 15, 17, and 19 to the rear differential 7, rendering the vehicle four-wheel driven.

When the meshing engagement of the dog clutch 505 is canceled, the electric motor 2129 is disconnected from the reduction gear set 19 and subsequent components on the rear wheel side.

The controller 2133 is adapted, like the first, second, third, or fourth embodiment, for operating the electric motor 2129 to make the dog clutch 505 meshing, rendering the vehicle four-wheel driven, when greater drive torque is desirable.

Further, when the vehicle is two-wheel driven or suffering a rollback, the controller 2133 stops rotation of the electric motor 2129, canceling meshing of the dog clutch 505, so that the electric motor 2129 is set free from being forced to rotate by rotation of the rear wheels.

Like this, the cancellation of meshing of the dog clutch 505 is promoted by the cam thrust force 539 of the meshing teeth 523 and 525.

When canceling meshing of the dog clutch 505, the controller 2133 follows an operation method according to the invention, in which revolution number of the driving electric motor 2129 is, or rotational direction of the driving electric motor 2129 is switched, to thereby give the meshing teeth 523 and 525 adequate vibrations to reduce frictional resistance.

By the cam thrust force 529 and vibrations to the meshing teeth 523 and 525, the cancellation of meshing of the dog clutch 313 can be performed in a fast response.

The dog clutch 505, sync hub 507, coupling sleeve 509, synchronized gear 511, synchronizer 513, ball cam 515, needle bearings 517, operation wire 519, direction change means 521, and the like constituting the on-off clutch 503 are exposed inside the casing 9, and immersed at lower parts in an oil sump. Further, oil is splashed about by rotation of the sync hub 507, coupling sleeve 509, synchronized gear 511, etc.

Therefore, the dog clutch 505 (meshing teeth 523 and 525), synchronizer 513, ball cam 515 (cam grooves 527 and 531, and balls 533), needle bearings 517, direction change means 521, and the like are well lubricated and cooled.

The power transmission system 501 of the electric motor 2129 is thus constructed.

In the power transmission system 501, such as when the vehicle is two-wheel driven or suffering a rollback, the electric motor 2129 is disconnected from the rear wheels by the on-off clutch 503, and is released not to be forced to rotate by rotation of the rear wheels.

In this power transmission system 501, the dog clutch 505 is employed for the on-off clutch 503, whereby there are achieved like effects to the power transmission system 301 or 401 of the third or fourth embodiment in which a meshing clutch is employed.

In this embodiment, the on-off clutch 5 is provided on a third shaft that is nearest to the differential apparatus 7 among shafts of the speed-reducing mechanism 3. Therefore, the system can be entirely compact in size, by disposing the on-off clutch 5 within a projection region of a large component such as a ring gear 31 of the differential apparatus 7.

Sixth Embodiment

With reference to FIG. 12, description is made of a transmission system 601 of drive power of an electric motor 2129 according to the sixth embodiment of the invention and a method of operation thereof.

The power transmission system 601 has features of the $1^{st}$, $2^{nd}$, $6^{th}$, $7^{th}$, $8^{th}$, $9^{th}$ and $13^{th}$ aspects of the invention, and the operating method has features of the $18^{th}$ and $19^{th}$ aspects of the invention. Note the terms "left" and "right" mean those of a vehicle equipped with the power transmission system 601, and those in FIG. 12. Like reference numerals are given to members having like functions as those of the power transmission systems 1, 201, 301, 401 and 501 according to the $1^{st}$, $2^{nd}$, $3^{rd}$, $4^{th}$ and $5^{th}$ embodiments of the invention, respectively. Those members with like functions are not described to avoid redundancy.

The power transmission system 601 is constituted with a speed-reducing mechanism 3, a rear differential 7 (as a differential apparatus), an on-off clutch 603 (as a clutch), a controller 2133, etc.

The on-off clutch 603 is arranged between outer and inner shafts 37 and 39, being responsible for command of the controller 2133 to be engaged and disengaged, in interconnection with electrical motor 2129, as described below.

The on-off clutch 603 is constituted with a meshing clutch 605, a sync hub 607, a coupling sleeve 609, a synchronization gear 611, a synchronizer 613, a shift fork 625, an operation rod 627 and an air-type actuator 629.

The meshing clutch 605 is constituted with a meshing tooth 631 that is formed to the coupling sleeve 609 on its inner periphery, and a meshing tooth 633 that is formed to the synchronization gear 611 on its outer periphery.

The sync hub 607 is spline connected to an outer periphery of the inner shaft 39. The coupling sleeve 609 is connected to an outer periphery of sync hub 607 through a key for axial movement.

The gear 611 is formed integrally to the outer shaft 37 at its left end.

The synchronizer 613 synchronizes rotations with coupling sleeve 609 (inner shaft) and synchronization gear 611 (outer shaft) to set phases of meshing tooth 631 and 633.

The shift fork 625 is slidably engaged with a circular groove 635 defined by coupling sleeve 609, being fixed on the operation rod 627.

The operation rod 627 is movably engaged with a supporting hole of the gear casing 11 to guide axial movement of shift fork 625. The operation rod 627 and gear casing 11 have an oil seal 637 arranged therebetween, the oil seal being for an oil to be prevented from leak to the outside.

The actuator 629 is linked to operation rod 627. Its pressure chamber 639 is connected to a pressure source that includes an air pump and accumulator through a valve mechanism.

The controller 2133 operates the valve mechanism to feed an air at a pressure to pressure chamber 639, thus to work actuator 629, or to let an air out to stop actuator 629.

The operation of actuator 629 moves shift fork 625 through operation rod 627 rightward to move coupling sleeve 609 rightward.

The rightward movement of coupling sleeve 609 operates synchronizer 613. When the coupling sleeve 609 and synchronization gear 611 synchronizes in rotation, the meshing teeth 631 and 633 of coupling sleeve 509 and synchronization gear 611, as shown by doubled-dots broken line, are meshed with each other, thus to engage the meshing clutch 605.

When the operation of actuator 629 is stopped, coupling sleeve 609 is brought back leftward, which disengages the meshing of clutch 605.

When meshing clutch 605 is in engagement, a drive force of the electric motor 2129 is transmitted through the reduction gear sets 15, 17 and 19 to the rear deferential 7, which renders the vehicle in four-wheel driven state. When the meshing clutch 605 is in disengagement, the electric motor 2129 detached from reduction gear set 19 at rear wheels.

The controller 2133, as similar to the first, second, third, fourth and fifth embodiments, operates electric motor 2129 for increase of drive torque of a vehicle, to engage the dog clutch 605 for four-wheel driven state.

When occurring two-wheel driven state or rollback state, the electric motor 2129 is stopped in rotation for the dog clutch 605 to be disengaged for detachment of the motor 2129 from the rear wheels, which allows front wheels to be prevented from forced rotation by rotation of rear wheels.

When the clutch 605 is disengaged, feed of an air of negative pressure to actuator 629 accelerates the disengagement of meshing.

In addition, when the controller 2133 disengages the meshing clutch 605, the number of rotation of electric motor 2129 in accordance with the operation method of embodiment, or switch of rotational direction gives the meshing teeth 631 and 633 appropriate vibrations for reduction of friction resistance.

The air of negative pressure and vibrations to be give to meshing teeth 631 and 633 allows the disengagement of meshing clutch 605 to be performed at remarkably quick response.

The meshing clutch 605, constituting the on-off clutch 603, is exposed inside the casing 9, a lower half portion of which is immersed in an oil sump and to the periphery of which rotations of the sync hub 607, coupling case 609 and synchronization gear 611 splash oil.

Thus, the meshing clutch 605 (meshing teeth 631 and 633) and synchronizer 613 is lubricated and cooled sufficiently.

This constitutes the electric motor 2129 and transmission system 601 of drive power.

The transmission system 601 detaches the electric motor 2129 and rear wheels from each other by the on-off clutch 603 (meshing clutch 605) in a two-wheel driven state or rollback, and the electric motor is not forced to rotate by rotation of the rear wheels.

In addition, the transmission system 601 employs the meshing clutch 605 for on-off clutch 603, to obtain benefits equivalent to those of the transmission systems 301, 401 and 501 of the third, fourth and fifth embodiments employing the meshing clutches.

The embodiment has the on-off clutch 5 that is provided to the third shaft closest to the differential 7 in the speed-reducing mechanism 3, and within projection region of a large component, such as the ring gear 31 of differential 7, is arranged the on-off clutch 5, which allows the differential to be entirely small in size.

The actuator 629 may be hydraulically operated.

Seventh Embodiment

With reference to FIG. 13, description is made of a transmission system 701 of drive power of an electric motor 2129 according to the fifth embodiment of the invention and a method of operation thereof.

The power transmission system 701 has features of the $1^{st}$, $2^{nd}$, $6^{th}$, $7^{th}$, $8^{th}$, $9^{th}$, $13^{th}$, and $14^{th}$ aspects of the invention and the operating method has features of the $18^{th}$ and $19^{th}$ aspects of the invention. Note the terms "left" and "right" mean those of a vehicle equipped with the power transmission system 701, and those in FIG. 13. Like reference numerals are given to members having like functions as those of the power transmission systems 1, 201, 301, 401, 501 and 601 according to the $1^{st}$, $2^{nd}$, $3^{rd}$, $4^{th}$, $5^{th}$ and $6^{th}$ embodiments of the invention. Those members with like functions are not described to avoid redundancy.

The power transmission system 701 includes a speed-reducing mechanism 3, an on-off clutch 703 for electromagnetic control (as a clutch), a rear differential 7 and a controller 2133.

The on-off clutch 703 is disposed between an outer shaft 37 and an inner shaft 39 of the speed-reducing mechanism 3, and is connected/disconnected in association with the electric motor 2129 for driving rear wheels by the controller 2133.

The on-off clutch 703 has a dog clutch 705 (meshing clutch), an armature 707, a clutch ring 709, a return spring 711, an electromagnet 713 and other components.

The dog clutch 705 has a mating tooth 715 formed on a left part of the armature 707 and a mating tooth 717 formed on a right part of the clutch ring 709.

The armature 707 is connected to the outer shaft 37 movably in the axial direction with a spline member 719 provided therebetween. The clutch ring 709 is connected to the inner shaft 39 with a spline member 721 provided therebetween to be positioned with the snap ring 723 in the axial direction.

The return spring 711 is disposed between the armature 707 and the clutch ring 709, and biases the armature 707 to the right (in the direction that cancels engagement of the dog clutch 705).

A core 725 of the electromagnet 713 is fixed inside of a gear casing 11 via a connecting member 727 and a bolt 729. Its lead wire 731 is pulled out from the gear casing 11 to be connected to a battery mounted on the vehicle.

When the electromagnet 713 is excited, the armature 707 is attracted to the left to establish engagement of the dog clutch 705. When the excitation of the electromagnet 713 is stopped, the armature 707 is returned to the right by a biasing force of the return spring 711 to cancel the engagement of the dog clutch 705.

When the dog clutch 705 is engaged, drive power of the electric motor 2129 is transmitted to the rear differential 7 through reduction gear sets 15, 17 and 19 to make the vehicle in a four-wheel driven state. When the engagement of the dog clutch 705 is cancelled, the electric motor 2129 is disconnected form the reduction gear set 19 and the subsequent components on the rear wheel side.

As in $1^{st}$, $2^{nd}$, $3^{rd}$, $4^{th}$, $5^{th}$ and $6^{th}$ embodiments, when it is desired to increase drive torque of the vehicle, the controller 2133 actuates the electric motor 2129 for driving rear wheels to make the dog clutch 705 in engagement to provide a four-wheel drives state.

A two-wheel driven state or a rollback phenomenon is generated, rotation of the drive electric motor 2129 is stopped to cancel the engagement of the dog clutch 705 and disconnect the electric motor 2129 from the rear wheels to prevent the motor 2129 from being forcefully rotated with the rotation of the rear wheels.

As described above, the cancellation of engagement of the dog clutch 705 is accelerated by a biasing force of the return spring 711.

Further, when canceling engagement of the dog clutch 705, the controller 2133 changes the number of rotation of the drive electric motor 2129 in accordance with the operation method of the embodiment or changes the rotational direction to give appropriate vibration to the mating teeth 715 and 717 to reduce their frictional resistance.

The biasing force of the return spring 711 and the vibration given to the mating teeth 715 and 717 allows the cancellation of engagement of the dog clutch 705 with significantly quick response.

Further, the dog clutch 705 constituting the on-off clutch 703, the electromagnet 713 or other components are exposed inside of the casing 9, and the half-bottom parts thereof are immersed in an oil sump and are splashed around with oil with rotation of the armature 707, the clutch ring 709 and other components.

Accordingly, the dog clutch 705 (mating teeth 715 and 717), the spline member 719 and other components are sufficiently lubricated/cooled to accelerate movement of the armature 707 to facilitate cancellation of engagement of the dog clutch 705.

The electromagnet 713 is cooled with oil to have stabled properties and also warms the oil, eliminating the need for measures such as reducing the viscosity of the oil or raising temperature.

The transmission system 701 of drive power of the electric motor 2129 is constituted in this manner.

When in a two-wheel driven state or a rollback phenomenon is generated, the on-off clutch 703 (dog clutch 705) disconnects the electric motor 2129 from the rear wheels, preventing the electric motor 2129 from being forcefully rotated.

In addition, the power transmission system 701 employs the dog clutch (meshing clutch) for the on-off clutch 703, having similar effects to those of the power transmission systems 301, 401, 501 and 601 of the $3^{rd}$, $4^{th}$, $5^{th}$ and $6^{th}$ embodiments in which a meshing clutch is used.

Futher, in this embodiment, the on-off clutch 5 is provided at a third shaft closest to the differential system 7 in the speed-reducing mechanism 3, so that the on-off clutch 5 can be disposed within a projection region of larger components such as the ring gear 31 of the differentia system 7, to make the entire system compact.

Eighth Embodiment

With reference to FIG. 14, description is made of a transmission system 801 of drive power of an electric motor 2129 according to the eighth embodiment of the invention and a method of operation thereof.

The power transmission system 801 has features of the $1^{st}$, $2^{nd}$, $8^{th}$, $9^{th}$ and $15^{th}$ aspects of the invention and the operating method has features of the $18^{th}$ and $19^{th}$ aspects of the invention. Note the terms "left" and "right" mean those of a vehicle equipped with the power transmission system 801, and those in FIG. 14. Like reference numerals are given to members having like functions as those of the power transmission systems 1, 201, 301, 401, 501, 601 and 701 according to the $1^{st}$, $2^{nd}$, $3^{rd}$, $4^{th}$, $5^{th}$, $6^{th}$ and $7^{th}$ embodiments of the invention. Those members with like functions are not described to avoid redundancy.

The power transmission system 801 includes a speed-reducing mechanism 3, a rear differential 803, a one-way clutch 805 (as a clutch), an on-off clutch 807, a controller 2133, etc.

The rear differential 803 has a differential case 223, a rotation case 809, and a bevel gear-type differential mechanism 227.

A pinion shaft 237 of the differential mechanism 227 is engaged with the rotation case 809 to be fixed.

The one-way clutch 805 is disposed between the rotation case 809 and the differential case 223 in the direction that transmits drive power of the electric motor 2129 to rear wheels when the vehicle runs forward (in the direction that establishes connection of the clutch 805 in a torque direction where the differential case 223 rotates before the rotation case 809).

Accordingly, when the electric motor 2129 is rotated, the resultant drive power reduced by reduction gear sets 15, 17 and 19 is transmitted from the one-way clutch 805 to the differential mechanism 227 to be distributed to the right and left rear wheels, making the vehicle in a four-wheel driven state.

When rotation of the electric motor 2129 is stopped, the rotation case 809 on the rear wheel side rotates before the differential case 223 to cancel connection of the one-way clutch 805, making the vehicle in a two-wheel driven state, and the rotation of the rear wheels is isolated from the electric motor 2129, preventing the electric motor 2129 from being forcefully rotated by rotation of the rear wheels.

The on-off clutch 807 has a dog clutch 811 (meshing clutch), an air actuator 813 for operation thereof, a return spring 815 and a controller 2133.

The dog clutch 811 has mating teeth 819 and 821 formed in a clutch ring 817 and the rotation case 809, respectively.

The clutch ring 817 has, like the dog clutch 313 (in the third embodiment), a proximal part with the engaging tooth 819 and a plurality of arms formed at the proximal part. The arms are protruded to the outside, engaging with an opening of the differential case 223 so as to connect the clutch ring 817 movably in the axial direction to the differential case 223.

The clutch ring 817 moving to the right engages the mating teeth 819 and 821 (dog clutch 811) with each other, and the clutch ring 817 returning to the left cancels the engagement of the dog clutch 811.

Upon the engagement of the dog clutch, rotation of the differential case 223 is transmitted from the rotation case 809 to the differential mechanism 227. Upon the disengagement of the dog clutch 811, the rotation case 809 and the subsequent components on the rear wheel side are disconnected.

Like the dog clutch 313, the mating teeth 819 and 821 of the dog clutch 811 each have a cam angle. When transmission torque is applied to the mating teeth 819 and 821, the cam angle causes a cam thrust force in a direction that moves the clutch ring 817 to the engagement-cancelled side.

The return spring 815 biases the clutch ring 817 to the engagement-cancelled side at any time.

A pressure chamber 823 of an actuator 813 is connected to a pressure source comprising an air pump and an accumulator via an airflow path 825 and a valve device.

The controller 2133 operates the valve device to send air pressure to the pressure chamber 823 to activate the actuator 813, and release the pressure to stop the operation of the actuator 813.

The actuator 813, when activated, moves the clutch ring 817 to the right to engage the mating teeth 819 and 821 (dog clutch 811) with each other. When the actuator 813 is stopped, the cam thrust force due to the cam angle and the biasing force of the return spring 815 returns the clutch ring 817 to the left to cancel the engagement of the dog clutch 811.

For example, when the vehicle runs backward, the connection of the on-off clutch 807 (dog clutch 811) transmits drive power of the electric motor 2129 to the differential mechanism 227 to allow backward running in a four-wheel driven state.

At the time of forward running, the connection of the on-off clutch 807 distributes drive power of the electric motor 2129 to both the one-way clutch 805 and the dog clutch 811, so that load on the clutches is reduced, improving durability and making their capacities smaller.

The controller 2133, when the vehicle starts moving, for example, rotates the electric motor 2129 with the connection of the on-off clutch 807 cancelled, to drive the rear wheels via the one-way clutch 805 and assist drive power of the engine, as well as to stop rotation of the electric motor 2129 at a prescribed vehicle speed.

When rotation of the electric motor 2129 is stopped, connection of the one-way clutch 805 is cancelled regardless of vehicle speed while the vehicle runs, to disconnect the electric motor 2129 from the rear wheels to prevent the motor 2129 from being forcefully rotated with the rotation of the rear wheels.

When it is desired to increase riding performances such as on differences in level or cavities in road and acceleration ability, the electric motor 2129 is rotated to provide a four-wheel driven state to send drive power to the rear wheels with the one-way clutch 805 in forward running or with both the one-way clutch 805 and the on-off clutch 807 in backward running.

Cancellation of engagement of the dog clutch 811 is, as described above, accelerated by the cam thrust force of the cam angle and the biasing force of the return spring 815.

In addition, the controller 2133, when canceling engagement of the dog clutch 811, changes the number of rotation of the drive electric motor 2129 in accordance with the operation method of the embodiment, or changes the rotational direction to give appropriate vibration to the mating teeth 819 and 821 to reduce its frictional resistance.

The cam thrust force 329, the biasing force and the vibration given to the mating teeth 819 and 821 provides cancellation of engagement of the dog clutch 811 with significantly quick response.

Further, oil is flown in from an oil sump of a casing 9 to the differential case 223 via oil grooves of the opening and the boss parts 259 and 261 to sufficiently lubricate/cool engaging parts of gears of the differential mechanism 227, the one-way clutch 805, the dog clutch 811 and other components.

The differential case 223 and the rotation case 809 are provided with oil flow paths 827 and 829, respectively, which are communicated with the one-way clutch 805, to form a back and forth path through the one-way clutch 805.

When the differential case 223 is in a stopped state, oil is supplied from the oil path 827 on the differential case 223 side immersed in the oil sump to the one-way clutch 805. When the differential case 223 is rotated, the resultant centrifugal force supplies inside oil from the oil path 829 of the rotation case 809 to the one-way clutch 805, which oil is further emitted from the oil path 827 to the outside to sufficiently lubricate/cool the one-way clutch 805.

The transmission system 801 of drive power of the electric motor 2129 is thus constituted.

As described above, when the vehicle runs forward, the power transmission system 801 rotates the electric motor 2129 to drive the rear wheels via the one-way clutch 805, and stops rotation of the electric motor 2129 to disconnect the motor 2129 from the rear wheels with the interruption function of the one-way clutch 805, thereby to protect the electric motor 2129 from rotation of the rear wheels.

The power transmission system 801 has like effects to those of the power transmission system 1 except for the effects produced by disposing the on-off clutch 5 in the speed-reducing mechanism, using a multi-plate clutch for the on-off clutch and using the gear pump 93 for lubrication.

In addition, the one-way clutch 805 does not cause rotation resistance such as dragging torque at the cancellation of its connection, improving fuel efficiency when rotation of the electric motor 2129 is stopped (in a two-wheel driven state) and the durability of the electric motor 2129.

The one-way clutch 805 eliminates the need for an operation mechanism and a control mechanism, and also provide large capacity even with a compact size and light weight. Consequently the power transmission system 801 has the more-simplified structure, lower cost, lighter weight, more compact size and better vehicle-mountability and can handle larger drive power.

The actuator 813 can be hydraulic.

Ninth Embodiment

With reference to FIG. 15, description is made of a transmission system 901 of drive power of an electric motor 2129 according to the ninth embodiment of the invention and a method of operation thereof.

The power transmission system 901 has features of the 1st, 2nd, 6th, 7th 8th, 9th and 16th aspects of the invention and the operating method has features of the 18th and 19th aspects of the invention. Note the terms "left" and "right" mean those of a vehicle equipped with the power transmission system 901, and those in FIG. 15. Like reference numerals are given to members having like functions as those of the power transmission systems 1, 201, 301, 401, 501, 601, 701 and 801 according to the 1st, 2nd, 3rd, 4th, 5th, 6th, 7th and 8th embodiments of the invention. Those members with like functions are not described to avoid redundancy.

The power transmission system 901 includes a speed-reducing mechanism 3, a two-way clutch 903 (as a clutch), a rear differential 7, a controller 2133, etc.

The two-way clutch 903 is constituted with an outer holder 905 fixed to an outer shaft 37, an inner holder 909 disposed between the outer holder 905 and an inner shaft 39 and supported via ball bearings 907 on the inner shaft 39, a switching knob 913 pressed against the inner holder 909 by a disc spring 911, a plurality of sprags, etc.

The outer and inner holders 905 and 907 have a plurality of circumferentially equi-spaced cutouts with the sprags disposed therein for outer and inner end parts being in contact with the outer shaft 37 and the inner shaft 39, respectively.

An end of the switching knob 913 is engaged with a recess 915 of a gear casing 11. Rotation of the outer shaft 37 generates relative rotation between the inner holder 909 coupled to a stationary side (casing 9) via the switching knob 913 biased by the disc spring 911 and the outer holder 905 fixed to the outer shaft 37. The sprags are inclined in the relative rotational direction to provide a standby state for drive power transmission.

When the outer shaft 37 is rotated in the opposite direction, the relative rotation is in the opposite direction. The sprags are inclined in this direction to provide a standby state for transmitting drive power in the opposite direction.

In each standby state, when the outer shaft 37 (electric motor 2129) rotates before the inner shaft 39 (rear wheels) does, the sprags are locked to the outer shaft 37 and the inner shaft 39 to make the two-way clutch 903 connected, whereby drive power of the electric motor 2129 is transmitted to the rear wheels.

On the contrary, when the inner shaft 39 (rear wheels) rotates before the outer shaft 37 (electric motor 2129) does, the sprags are disengaged from the outer shaft 37 and the inner shaft 39 to cancel the connection of the two-way clutch 903, whereby the electric motor 2129 is disconnected from the rear wheels.

The controller 2133 rotates the electric motor 2129 when the vehicle starts moving. When the electric motor 2129 is rotated, preceding rotation of the outer shaft 37 establishes connection of the two-way clutch 903 in the standby state for transmitting drive power in the advancing direction. The electric motor 2129 drives the rear wheels to assist drive power of the engine.

When the vehicle is accelerated to a prescribed speed, the controller 2133 stops rotation of the electric motor 2129.

The stopping of rotation of the electric motor 2129 cancels the connection of the two-way clutch 903 through preceding rotation of the inner shaft 39 associated with rotation of the rear wheels.

When a rollback phenomenon is produced while the vehicle drives up on a grade in a four-wheel driven state, the controller 2133 reverses the rotation of the electric motor 2129 to change the two-way clutch 903 to be on standby for the backing direction.

In the standby state for the backing direction, preceding rotation of the rear wheels caused by the rollback cancel the connection of the two-way clutch 903.

Thus, the canceling of connection of the two-way clutch 903 disconnects the electric motor 2129 from the rear wheels to be released from being forcefully rotated by rotation of the rear wheels.

When it is desired to increase drive torque while running to improve riding performances such as on differences in level or cavities in road and acceleration ability, the electric motor 2129 is rotated to provide the four-wheel driven state.

In the case of back running, the two-way clutch 903 is on standby for the backing direction. When the vehicle starts moving, the electric motor 2129 is protected from rotation of the rear wheels like when the vehicle advances, running down on a grade with reduced friction resistance.

When it is desired to accelerate canceling connection of the two-way clutch 903, the controller 2133 changes the number of rotation of the drive electric motor 2129 according to the operation method of this embodiment or changes the direction of rotation to give appropriate vibration to the two-way clutch 903, thereby to facilitate the cancellation of lock of the sprags to the outer shaft 37 and the inner shaft 39.

Accordingly, connection of the two-way clutch 903 is cancelled with significantly quick response.

The outer shaft 37 is provided with an oil flow path 917. The inner shaft 39 is provided with oil flow paths 919 and 921. These paths constitute a back and forth path through the two-way clutch 903.

When the outer shaft 37 is stationary, oil is supplied from the oil path 917 of the outer shaft 37 immersed in an oil sump to the two-way clutch 903. Centrifugal force generated by rotation of the outer shaft 37 supplies oil to the two-way clutch 903 through the oil paths 919 and 921, and emits it from the oil path 917 to the outside to sufficiently lubricate/cool the two-way clutch 903.

Thus the transmission system 901 of drive power of the electric motor 2129 is constituted.

The use of the two-way clutch 903 in the power transmission system 901 as described above provides a protection for the electric motor 2129 from rotation of the rear wheels when the vehicle runs both forward and backward.

Further, the use of the two-way clutch 903 protects the electric motor 2129 and other elements from being affected by a rollback.

Further, the fact that it is needless to provide another clutch for back running provides a simplified structure, low cost, light weight, compact size and good vehicle-moutability.

Furthermore, in this embodiment, the on-off clutch 5 is provided at a third shaft closest in the speed-reduction mechanism 3 to the differential system 7, so that the on-off clutch 5 can be disposed within the projection region of larger components such as a ring gear 31 of the differential system 7 to make the entire system compact.

In addition, the power transmission system 901 has like effects to those of the power transmission system 801 of the eighth embodiment.

Tenth Embodiment

With reference to FIG. 16, description is made of a transmission system 1001 of drive power of an electric motor 2129 according to the tenth embodiment of the invention and a method of operation thereof.

The power transmission system 1001 has features of the 1st, 2nd, 8th, 12th, and 19th aspects of the invention, and the operating method has features of the 21st and 22nd aspects of the invention. Note the terms "left" and "right" mean those of a vehicle equipped with the power transmission system 1001, and those in FIG. 16. Like reference numerals are given to members having like functions as those of the power transmission systems 1, 201, 301, 401, 501, 601, 701, 801 and 901 according to the 1st, 2nd, 3rd, 4th, 5th, 6th, 7th, 8th, 9th and 10th embodiments of the invention, respectively. Those members with like functions are not described to avoid redundancy.

The power transmission system 1001 includes a speed-reducing mechanism 3, a rear differential 1003, a two-way clutch 1005 (as a clutch), a controller 2133, etc.

The rear differential 1003 has a differential case 223, a rotation case 1007, and a bevel gear-type differential mechanism 227.

The rotation case 1007 is supported via ball bearings 1009 on the internal periphery of the differential case 223. A pinion shaft 237 of the differential mechanism 227 is engaged with the rotation case 1007 to be fixed.

The two-way clutch 1005 is disposed between the rotation case 1007 and the differential case 223. When the connection of the two-way clutch 1005 is established, the drive force of an electric motor 2129 which is reduced in the speed-reducing mechanism 3 is transmitted from the differential mechanism 227 to rear wheels. When the connection is canceled, the electric motor 2129 is disconnected from the rear wheels.

The two-way clutch is constituted with an outer holder 1011 fixed to the differential case 223, an inner holder 1015 disposed between the outer holder 1011 and the rotation case 1007 and supported via ball bearings 1013 on the differential case 223, a switching knob 1019 pressed against the inner holder 1015 by a disc spring, a plurality of sprags, etc.

As in the two-way clutch 903 (ninth embodiment), the outer and inner holders 1011 and 1015 have a plurality of circumferentially equi-spaced cutouts with the sprags disposed therein for outer and inner end parts being in contact with the differential case 223 and the rotation case 1007, respectively.

An end of the switching knob 1019 is engaged with a recess 1021 of a gear casing 11. Rotation of the differential case 223 generates relative rotation between the inner holder 1015 coupled to a stationary side (casing 9) via the switching knob 1019 biased by the disc spring 1017 and the outer holder 1011 on the differential case 223 side. The sprags are inclined in the relative rotational direction to provide a standby state for drive power transmission.

When the differential case 223 is rotated in the opposite direction, the relative rotation is in the opposite direction. The sprags are inclined in this direction to provide a standby state for transmitting drive power in the opposite direction.

In each standby state, when the differential case 223 (electric motor 2129) rotates before the rotation case 1007 (rear wheels) does, the sprags are locked to the differential case 223 and the rotation case 1007 to make the two-way clutch 1005 connected, whereby drive power of the electric motor 2129 is transmitted to the rear wheels.

On the contrary, when the rotation case 1007 (rear wheels) rotates before the differential case 223 (electric motor 2129) does, the sprags are disengaged from the differential case 223 and the rotation case 1007 to cancel the connection of the two-way clutch 1005, whereby the electric motor 2129 is disconnected from the rear wheels.

The controller 2133 rotates the electric motor 2129 when the vehicle starts moving. The rotation of the electric motor 2129 connects the two-way clutch 1005 in the standby state for transmitting drive power in the advancing direction, and the drive power of the electric motor 2129 is transmitted to the rear wheels.

When the vehicle is accelerated to a prescribed speed, the controller 2133 stops rotation of the electric motor 2129.

The stopping of rotation of the electric motor 2129 cancels the connection of the two-way clutch 1005 through the rotation of the rear wheels.

When a rollback phenomenon is produced when the vehicle drives up on a grade in a four-wheel driven state, the controller 2133 reverses the rotation of the electric motor 2129 to change the two-way clutch 1005 to be on standby for the backing direction.

In the standby state for the backing direction, the preceding rotation of the rear wheels caused by the rollback cancel the connection of the two-way clutch 1005.

Thus the canceling of the connection of the two-way clutch 1005 disconnects the electric motor 2129 from the rear wheels to be released from being forcefully rotated by the rotation of the rear wheels.

When it is desired to increase drive torque while running to improve performance in running over steps, bumps or potholes and acceleration, the electric motor 2129 is rotated to provide the four-wheel driven state.

In the case of back running, the two-way clutch 1005 is on standby for the backing direction. When the vehicle starts moving, the electric motor 2129 is protected from rotation of the rear wheels like when the vehicle advances, running down on a grade with reduced friction resistance.

When it is desired to accelerate the canceling of connection of the two-way clutch 1005, the controller 2133 changes the number of rotation of the drive electric motor 2129 according to the operation method of this embodiment or changes the direction of rotation to give appropriate vibration to the two-way clutch 1005, thereby to facilitate the cancellation of lock of the sprags to the differential case 223 and the rotation case 1007.

Accordingly, the connection of the two-way clutch 1005 is cancelled with significantly quick response.

The differential case 223 has an opening 1023, and bosses 259 and 261 with oil grooves through which oil is flown in or out of the case 223. The flown-in oil sufficiently lubricate/cool engaging parts of gears of the differential mechanism 227, the two-way clutch 1005 and the ball bearings 1009 with the rotation of the differential case 223.

The differential case 223 is provided with an oil flow path 1025. The rotation case 1007 is provided with an oil flow path 1027. These paths constitute a back and forth path through the two-way clutch 1005.

When the differential case 223 is stationary, oil is supplied from the oil path 1025 of the differential case 223 immersed in an oil sump to the two-way clutch 1005. Centrifugal force generated by the rotation of the differential case 223 supplies inside oil to the two-way clutch 1005 through the oil path 1027, and emits it from the oil path 1025 to the outside to sufficiently lubricate/cool the two-way clutch 1005.

Thus the transmission system 1001 of the drive power of the electric motor 2129 is constituted.

The use of the two-way clutch in the power transmission system 1001 as described above provides a protection for the electric motor 2129 from the rotation of the rear wheels when the vehicle runs both forward and backward, resulting in similar effects to those of the power transmission system 901 in the ninth embodiment.

Eleventh Embodiment

With reference to FIG. 17, description is made of a transmission system 1101 of drive power of an electric motor 2129 according to the eleventh embodiment of the invention and a method of operation thereof.

The power transmission system 1101 has features of the $1^{st}$, $2^{nd}$, $8^{th}$, $12^{th}$ and $20^{th}$ aspects of the invention, and the operating method has features of the $21^{st}$ and $22^{nd}$ aspects of the invention. Note the terms "left" and "right" mean those of a vehicle equipped with the power transmission system 1101, and those in FIG. 17. Like reference numerals are given to members having like functions as those of the power transmission systems 1, 201, 301, 401, 501, 601, 701, 801, 901, and 1001 according to the $1^{st}$, $2^{nd}$, $3^{rd}$, $4^{th}$, $5^{th}$, $6^{th}$, $7^{th}$, $8^{th}$, $9^{th}$, $10^{th}$ and $11^{th}$ embodiments of the invention, respectively. Those members with like functions are not described to avoid redundancy.

The power transmission system 1101 includes a speed-reducing mechanism 3, a rear differential 1103, a centrifugal clutch 1105 (as a clutch), a controller 2133, etc.

The rear differential 1103 has a differential case 223, a rotation case 1107 and a bevel gear-type differential mechanism 227.

The rotation case 1107 is disposed rotatably on the internal periphery of the differential case 223. A pinion shaft 237 of the differential mechanism 227 is engaged with the rotation case 1107 and fixed with a snap ring 1109.

The centrifugal clutch 1105 is disposed between a left-side gear 241 of the differential mechanism 227 and the differential case 223, and has engaging holes 1111 and 1113 provided in the side gear 241 and the differential case 223, respectively, in the centrifugal force direction, engaging member 115 engaged with the engagement hole 1111 in the side gear 241, a coil spring 1117 biasing the engaging member 1115 to the engaging hole 1113 in the differential case 223 against centrifugal force, etc.

When the rear differential 1103 is stationary, the biasing force of the coil spring 1117 engages the engagement member 1115 with the engagement hole 1113 to establish connection of the centrifugal clutch 1105.

At the connection of the centrifugal clutch 1105, the side gear 241 is locked to the differential case 223, the differential case 223 and the differential mechanism 227 (the rotation case 1007: rear wheels) are connected, and the drive power of the electric motor 2129 is transmitted from the differential mechanism 227 to the rear wheels. Differential rotation of the differential mechanism 227 is also locked.

When the rear differential 1103 is rotated, the resultant centrifugal force applied to the engaging member 1115 deforms the coil spring 1117, the engaging member 1115 is moved to cancel its engagement with the engaging hole 1113, and the connection of the centrifugal clutch 1105 is canceled.

At the cancellation of the connection of the centrifugal clutch 1105, the side gear 241 is released to rotate, the connection between the differential mechanism 227 and the differential case 223 is cancelled, the electric motor 2129 is disconnected from the rear wheels, and the differential lock of the differential mechanism 227 is released.

The coil spring 1117 has a property (biasing force) of canceling the connection of the centrifugal clutch 1105 when vehicle speed is increased to a prescribed level.

The controller 2133 rotates the electric motor 2129 when the vehicle starts moving. While the vehicle is accelerated to a prescribed speed, the electric motor 2129 drives the rear wheels via the centrifugal clutch 1105 to assist the drive power of the engine, improving properties in starting and acceleration and also improving performance in running over steps, bumps or potholes.

Further, differential motions of the differential mechanism 227 is locked as described above, which fact improves properties in starting, acceleration and performance in running over steps, bumps or potholes on roads with reduced friction resistance.

When the connection of the centrifugal clutch 1105 is cancelled at a prescribed vehicle speed, the controller 2133 sequentially stops the rotation of the electric motor 2129.

In this state, the electric motor 2129 is disconnected from the rear wheels by the centrifugal clutch 1105 and is thus prevented from being forcefully rotated by rotation of the rear wheels.

At the time of back running, connection and disconnection of the centrifugal clutch 1105 can, as in the forward running, start and accelerate the vehicle or disconnect the electric motor 2129 from the rear wheels.

When it is desired to accelerate the canceling of connection of the centrifugal clutch 1105, the controller 2123 changes the number of rotation of the drive electric motor 2129 or changes the rotational direction in accordance with the operation method of this embodiment, to provide appropriate vibration to the centrifugal clutch 1105, thereby to facilitate disengagement between the engaging member 1115 and the engaging hole 1113.

Accordingly, the cancellation of connection of the centrifugal clutch 1105 is performed with significantly quick response.

The differential case 223 has an opening 1119 and bosses 259 and 261 with oil grooves through which oil is flown in or out of the case 223. The flown-in oil sufficiently lubricates/cools engaging parts of gears of the differential mechanism 227 with the rotation of the case 223, and lubricates sliding parts of the engaging member 1115 and the engaging hole 1113 of the centrifugal clutch 1105, thereby to further accelerate the cancellation of the connection of the centrifugal clutch 1105.

Thus the transmission system 1101 of drive power of the electric motor 2129 is constituted.

In the power transmission system 1101, the electric motor 2129 is, as described above, disconnected from the rear wheels by the centrifugal clutch 1105 when necessary.

Further, the power transmission system 1101 provides similar effects to those of the power transmission system 1 except for the effects obtained by disposing the clutch 5 between the speed-reducing mechanisms, using a multi-plate clutch for the clutch 5 and using the gear pump 93 for lubrication.

In addition, the cancellation of connection of the centrifugal clutch 1105 does not cause rotation resistance such as dragging torque, improving fuel efficiency at the time of stopping rotation of the electric motor 2129 (two wheel driven) and durability.

Further, the centrifugal clutch 1105 eliminates the need for an operating mechanism and a control mechanism and provides large capacity even with its small size and light weight. This makes the power transmission system 1101 have easy structure, low cost, light weight, compact size, good vehicle mountability and an ability of handling large drive power.

The centrifugal clutch can be disposed between the differential case 223 and the rotation case 1107 instead of between the differential case 223 and the side gear 214.

In this case, the differential mechanism 227 can differentially distribute drive power of the electric motor 2129 to the rear wheels.

Twelfth Embodiment

With reference to FIG. 18 and FIG. 19, description is made of a transmission system 1201 of drive power of an electric motor 2129 (see FIG. 2) according to the twelfth embodiment of the invention and a method of operation therefor.

The power transmission system 1201 has features of the $1^{st}$, $2^{nd}$, $3^{rd}$, $4^{th}$, $5^{th}$, $8^{th}$, $9^{th}$, $10^{th}$, $11^{th}$, $12^{th}$, $16^{th}$ and $17^{th}$ aspects of the invention, and the operating method has features of the $21^{st}$ and $22^{nd}$ aspects of the invention. Note the terms "left" and "right" mean those of a vehicle equipped with the power transmission system 1201, and those in FIG. 18. Like reference numerals are given to members having like functions as those of the power transmission systems 1, 201, 301, 401, 501, 601, 701, 801, 901, 1001 and 1101 according to the $1^{st}$, $2^{nd}$, $3^{rd}$, $4^{th}$, $5^{th}$, $6^{th}$, $7^{th}$, $8^{th}$, $9^{th}$, $10^{th}$, $11^{th}$, $12^{th}$, $13^{th}$ and $14^{th}$ embodiments of the invention, respectively. Those members with like functions are not described to avoid redundancy.

The power transmission system 1201 includes a speed-reducing mechanism 1203, a rear differential 1205, an on-off clutch 1207 (as a clutch), a gear pump 1209 (as a trochoid pump), a controller 2133 (see FIG. 2), etc.

The rear differential 1205 and the on-off clutch 1207 are disposed in a reversed manner in the right and left direction of that of the rear differential 405 and the on-off clutch 407 of the fourth embodiment (FIG. 6), and have the same functions.

The speed-reducing mechanism 1203 is constituted with three-stage reduction gear sets. A reduction gear set 1211 of a planetary gear type is in the first stage. Reduction gear sets 17 and 19 are in the second and third stages.

The reduction gear set 1211 of the planetary gear type is, as shown in FIG. 19, constituted with an internal gear 1213, three pinion gears 1215 engaged with the internal gear 1213, a sun gear 1217 engaged with the pinion gears 1215, etc.

The internal gear 1213 is welded to a gear casing 11.

The pinion gears 1215 are disposed circumferentially at the same intervals. The pinion gears 1215 are supported on pinion shafts 1219. The pinion shafts 1219 are supported at their both ends with right and left pinion carriers 1221 and 1223. The pinion carriers 1221 and 1223 are integrated at coupling parts 1225.

The left pinion carrier 1221 is welded to a second shaft 35 of the reducing gear set 17.

The sun gear 1217 is formed at a first hollow shaft 1227. The first shaft 1227 is supported on its left end on the internal periphery of the second shaft 35 via needle bearings 1229 and is supported on its right end on the internal periphery of the right pinion carrier 1223 via ball bearings 1231.

To the first shaft 1227, an output axis 1233 of an electric motor 2129 for driving rear wheels is spline-coupled. An oil seal 1235 is disposed between the first shaft 1227 and the gear casing 11 to prevent the leakage of oil. The first shaft 1227 is sealed at its internal periphery with a lid member 1237 to prevent the leakage of oil and the intrusion of foreign material.

When the electric motor 2129 is rotated, the resultant drive power is input from the sun gear 1217 to the reduction gear set 1211 of a planetary gear, and reduced by the rotation and revolution of the pinion gears 1215, and further reduced by the reduction gear sets 17 and 19 to rotate a differential case 223 of the rear differential 1205.

When it is desired to increase drive torque of the vehicle, the controller 2133 rotates the electric motor 2129 to establish the engagement of a dog clutch 411 of the on-off clutch 1207, thereby to provide a four-wheel driven state.

When a two wheel driven state or a rollback phenomenon is produced, the rotation of the electric motor 2129 is stopped to cancel the engagement of the dog clutch 411, thereby to disconnect the electric motor 2129 from rear wheels to prevent it from being unnecessarily rotated by the rotation of the rear wheels.

The gear pump 1209 is disposed between the gear casing 11 and the second shaft 35 to be driven by the rotation of the second shaft 35.

The second shaft 35, the pinion carrier 1221 and the pinion gear 1219 are provided with oil paths 1239, 1241, 1243 and 1245. The oil path 1239 of the second shaft 35 is sealed with a lid member 1247. The oil path 1243 of the pinion gear 1219 is sealed with a ball 1249 pressed fitted therein. When the gear pump 1209 is driven, oil is sucked up from an oil sump of a casing 9 (see e.g., FIG. 1) to be sent to the reduction gear set 1211 through the oil paths 1239, 1241, 1243 and 1245.

The rotation of the second shaft 35 generates centrifugal pump effects in a diameter-enlarged part 1251 formed in the oil path 1239, accelerating the transfer of the oil.

The oil sent to the reduction gear set 1211 sufficiently lubricates/cools engaging parts of the gears 1213, 1215 and 1217, a supported part of the pinion gear 1215, the needle bearings 1229 and the ball bearings 1231.

An oil seal 1253 is disposed between the third shaft 213 and the gear casing 11 to prevent the leakage of oil.

Thus the transmission system 1201 of the drive power of the electric motor 2129 is constituted.

In the power transmission system 1201, the electric motor 2129 is disconnected from the rear wheels by the on-off clutch 1207 when necessary to be prevented from being unnecessarily rotated by the rotation of the rear wheels as described above.

The power transmission system 1201 has similar effects to those of the power transmission system 401 of the fourth embodiment of the invention.

In addition, the power transmission system 1201 has the reduction gear set 1211 of a planetary gear as the first-stage reduction mechanism, in which the first shaft 1227 is disposed concentrically with the second shaft 35, thereby having a three-shaft structure with one shaft less than other embodiments having a four-shaft structure including the rear differential, resulting in a largely compact size and an improved vehicle-mountability.

The third reduction gear set 19 (the final reduction gear set) and the reduction gear set 17 in the previous stage of the final reduction gear set 19 are disposed adjacent to each other in the axial direction, which allows making them compact in the axial direction. Further, the supporting span of the reduction gears can be short for proper meshing of bearings of the gears, which results in reduced vibration and improved durability.

The reduction gear set 17 in the previous stage of the final reduction gear set 19 is disposed on one side of the final reduction gear set 19 in the axial direction, and the differential system is disposed on the other side of the final reduction gear set 19 in the axial direction. Thus the casing 9 in which integrally mounted are the final reduction gear set and the differential system can have an unbalance-suppressed weight in the wheel axle direction (the transverse direction).

The clutch is disposed coaxially adjacent to and outside of the differential system in the axial direction. This also can suppress unbalance of the casing 9 in the wheel axle direction (the transverse direction). Further the clutch can be set with little restriction in interference with the peripheral members, which improves degree of freedom of design such as the size and the shape of the clutch and setting conditions of an actuator.

Thirteenth Embodiment

With reference to FIG. 20, description is made of a transmission system 1301 of drive power of an electric motor 2129 according to the thirteenth embodiment of the invention and a method of operation thereof.

The power transmission system 1301 has features of the $1^{st}$, $2^{nd}$, $3^{rd}$, $4^{th}$, $5^{th}$, $8^{th}$, $12^{th}$, $16^{th}$ and $17^{th}$ aspects of the invention, and the operating method has features of the $21^{st}$ and $22^{nd}$ aspects of the invention. Note the terms "left" and "right" mean those of a vehicle equipped with the power transmission system 1301, and those in FIG. 20. Like reference numerals are given to members having like functions as those of the power transmission systems 1, 201, 301, 401, 501, 601, 701, 801, 901, 1001, 1101 and 1201 according to the $1^{st}$, $2^{nd}$, $3^{rd}$, $4^{th}$, $5^{th}$, $6^{th}$, $7^{th}$, $8^{th}$, $9^{th}$, $10^{th}$, $11^{th}$ and $12^{th}$ embodiments of the invention, respectively. Those members with like functions are not described to avoid redundancy.

The power transmission system 1301 includes a speed-reducing mechanism 1203, a rear differential 1205, a connection/disconnection clutch 1207 (as a clutch), a screw pump 1303, a controller 2133, etc.

The screw pump 1303 has a shaft 1305 fixed to a gear casing 11, a spiral groove 1307 provided on the shaft 1305 and a oil path 1239 of a second shaft 35. The shaft 1305 is disposed concentrically with the oil path 1239.

With rotation of the second shaft 35, oil in the oil path 1239 is rotated because of its viscosity. The rotated oil moves along the spiral groove 1307, sucking oil in a oil sump as shown by arrows 1309, to be sent to a reduction gear set 1211 through oil paths 1239, 1241, 1243 and 1245.

The oil sent to the reduction gear set 1211 sufficiently lubricates/cools engaging parts of gears 1213, 1215 and 1217, supported part of the pinion gears 1215 and the bearings 1229 and 1231.

Since a vehicle running backward is usually at a significantly low speed with small load on the reduction gear set 1211, which eliminates the need for an especially large lubrication mechanism.

The transmission system 1301 of drive power of the electric motor 2129 is constituted in this manner.

The power transmission system 1301 provides similar effects to those of the power transmission system 1201 of the twelfth embodiment.

In addition, the screw pump 1303 has a simple and low-cost structure and is easy to assemble. Thus, use of the screw pump 1303 allows the power transmission system 1301 to have a simple and low-cost structure and to be easy to assemble.

Fourteenth Embodiment

With reference to FIG. 21, description is made of a transmission system 1401 of drive power of an electric motor 2129 according to the fourteenth embodiment of the invention and a method of operation thereof.

The power transmission system 1401 has features of the $1^{st}$, $2^{nd}$, $3^{rd}$, $4^{th}$, $5^{th}$, $8^{th}$, $12^{th}$, $16^{th}$ and $17^{th}$ aspects of the invention, and the operating method has features of the $21^{st}$ and $22^{nd}$ aspects of the invention. Note the terms "left" and "right" mean those of a vehicle equipped with the power transmission system 1401, and those in FIG. 21. Like reference numerals are given to members having like functions as those of the power transmission systems 1, 201, 301, 401, 501, 601, 701, 801, 901, 1001, 1101, 1201 and 1301 according to the $1^{st}$, $2^{nd}$, $3^{rd}$, $4^{th}$, $5^{th}$, $6^{th}$, $7^{th}$, $8^{th}$, $9^{th}$, $10^{th}$, $11^{th}$, $12^{th}$ and $13^{th}$ embodiments of the invention, respectively. Those members with like functions are not described to avoid redundancy.

The power transmission system 1401 includes a speed-reducing mechanism 1203, a rear differential 1205, a connection/disconnection clutch 1207 (as a clutch), a centrifugal pump 1403, a controller 2133, etc.

A second shaft 35 of the speed-reducing mechanism 1203 is supported at its left end with a gear casing 11 via a taper roller bearing 1405. The taper roller bearing 1405 constitutes the centrifugal pump 1403.

When the second shaft 35 rotates, an inner race 1407 and a roller 1409 of the taper roller bearing 1405 are rotated. The resultant centrifugal force causes oil to hit upon an oblique surface of an outer race 1411. The oil moves as shown by arrows 1413, sucking oil in a oil sump to be sent to the reduction gear set 1211 through oil paths 1239, 1241, 1243 and 1245.

This oil transfer is speeded up by centrifugal pump effects of a diameter-enlarged part 1251 with the rotation of the second shaft 35.

The oil sent to the reduction gear set 1211 sufficiently lubricates/cools engaging parts of gears 1213, 1215 and 1217, supported part of the pinion gears 1215 and bearings 1229 and 1231.

The centrifugal pump 1403 functions in the same manner in both directions of rotation of the second shaft 35. Thus the reduction gear set 1211 is sufficiently lubricated/cooled in both forward running and backward running of a vehicle.

The transmission system 1401 of drive power of the electric motor 2129 is constituted in this manner.

The power transmission system 1401 provides similar effects to those of the power transmission system 1201 of the twelfth embodiment.

In addition, the fact that the taper roller bearing 1405 is used for the centrifugal pump 1403 realizes the power transmission system 1401 without complicating structure and assembling operation and increasing cost and weight.

The above embodiments show examples of application to an electric automobile with the engine as a main drive source and the electric motor 2129 as an auxiliary drive source. However, the transmission system of drive power of the electric motor 2129 of this invention can also be used for a vehicle with the electric motor 2129 as a main drive source.

Further, the differential system can be any one such as a planetary gear differential system, a differential system with an output-side gear coupled with a pinion gear slidably held in an accommodation hole of a differential case and a differential system with a worm gear, instead of the bevel gear-type differential system of the embodiments.

While preferred embodiments of the present invention have been described using specific terms, such description is for illustrative purposes, and it is to be understood that changes and variations may be made without departing from the spirit or scope of the following claims.

The invention claimed is:

1. A power transmission system for vehicles including a first pair of drive wheels and a second pair of drive wheels, the system comprising:

a main power transmission system configured to drive the first pair of wheels via a first train of torque transmitters; and an auxiliary power transmission system configured to transmit drive power from an electric motor to the second pair of drive wheels via an interruptive second train of torque transmitters including:
a differential;
a speed-reducing mechanism for reducing a rotational speed of the electric motor;
a two-way clutch disposed between the electric motor and the differential, wherein rotation of the electric motor before rotation of the differential operates the two-way clutch to connect the second train of torque transmitters and wherein rotation of the differential before rotation of the electric motor operates the two-way clutch to disconnect the second train of torque transmitters; and
a controller capable of changing a rotation of the electric motor so as to encourage disengagement of the clutch.

2. The power transmission system for vehicles according to claim 1, wherein said controller reverses the direction of rotation of the electric motor.

3. The power transmission system for vehicles according to claim 1, wherein said controller changes a rotational speed of the electric motor.

4. The power transmission system for vehicles according to claim 1, wherein said clutch is disposed coaxial to a reduction gear shaft upstream of the differential in the second train of torque transmitters.

* * * * *